(12) United States Patent
Thomas

(10) Patent No.: US 11,498,658 B2
(45) Date of Patent: Nov. 15, 2022

(54) SYSTEM FOR AN AIRCRAFT WING

(71) Applicant: Moog Wolverhampton Limited, Wolverhampton (GB)

(72) Inventor: Glynn Thomas, Wolverhampton (GB)

(73) Assignee: Moog Wolverhampton Limited, Wolverhampton (GB)

( * ) Notice: Subject to any disclaimer, the term of this patent is extended or adjusted under 35 U.S.C. 154(b) by 135 days.

(21) Appl. No.: 17/046,149

(22) PCT Filed: Apr. 17, 2019

(86) PCT No.: PCT/GB2019/051096
§ 371 (c)(1),
(2) Date: Oct. 8, 2020

(87) PCT Pub. No.: WO2019/202321
PCT Pub. Date: Oct. 24, 2019

(65) Prior Publication Data
US 2021/0039770 A1    Feb. 11, 2021

(30) Foreign Application Priority Data

Apr. 20, 2018 (GB) .................................. 1806477.4
May 31, 2018 (GB) .................................. 1808863.3

(51) Int. Cl.
*B64C 13/38* (2006.01)
*B64C 9/00* (2006.01)

(52) U.S. Cl.
CPC ............... *B64C 13/38* (2013.01); *B64C 9/00* (2013.01)

(58) Field of Classification Search
CPC .. B64C 13/38; B64C 9/00; B64C 9/20; B64C 13/30
See application file for complete search history.

(56) References Cited

U.S. PATENT DOCUMENTS

2005/0029407 A1    2/2005  Pohl et al.
2008/0283672 A1*  11/2008  Denzler ............. B64D 45/0005
                                                    244/213

(Continued)

FOREIGN PATENT DOCUMENTS

| DE | 102015201935 A1 | 8/2016 |
| GB | 2449172 A | 11/2008 |
| WO | 2015114586 A1 | 8/2015 |

OTHER PUBLICATIONS

European Patent Office, International Search Report and Written Opinion of the ISA from PCT/GB2019/051096 dated Jun. 12, 2019.

*Primary Examiner* — Rodney A Bonnette
(74) *Attorney, Agent, or Firm* — Harter Secrest & Emery LLP

(57) ABSTRACT

A system for an aircraft wing including a power drive unit (101), a first actuator (104C) for actuating a first aerodynamic device (103), a second actuator (104A) for actuating a second aerodynamic device (102), a first drive path (109B) configured to operate between the power drive unit (101) and the first actuator (104C), a second drive path (109A) operably connecting the power drive unit (101) and the second actuator (104A), the first drive path (109B) including a lost motion device (108A), the lost motion device (108A) being configured to selectively operably connect the power drive unit (101) to the first actuator (104C) and selectively operably disconnect the power drive unit (101) from the first actuator (104C).

25 Claims, 17 Drawing Sheets

(56) References Cited

U.S. PATENT DOCUMENTS

2015/0321750 A1* 11/2015 Denzler ............ B64D 45/0005
244/219
2016/0355253 A1 12/2016 Nfonguem

* cited by examiner

SYSTEM FOR AN AIRCRAFT WING

The present invention relates to a system for an aircraft wing.

Aircraft wings include aerodynamic devices such as leading edge flaps, tailing edge flaps, flaperons and the like. The aerodynamic devices are moved relative to the wing during flight to control the aircraft and improve efficiency.

In one example, the aircraft includes a first trailing edge flap and a second trailing edge flap on each wing. During take-off and/or landing the first and second trailing edge flaps are moved to a high lift position. During a cruise phase of the aircraft flight, wherein the aircraft may be flying at a high subsonic speed, movement of the first and second flaps may vary the camber of the wing. Varying the camber of the wing during a cruise phase is known to improve aircraft fuel efficiency.

According to an aspect of the present invention there is provided a system for an aircraft wing including a power drive unit, a first actuator for actuating a first aerodynamic device, a second actuator for actuating a second aerodynamic device, a first drive path configured to operate between the power drive unit and the first actuator, a second drive path operably connecting the power drive unit and the second actuator, the first drive path including a lost motion device, the lost motion device being configured to selectively operably connect the power drive unit to the first actuator and selectively operably disconnect the power drive unit from the first actuator wherein the lost motion device has a first part operably connected to the power drive unit and a second part operably connected to the first actuator wherein the system includes a first position sensor to determine the position of the first part or the second part relative to a wing and a second position sensor to determine the position of the first part relative to the second part.

The method may include moving the first actuator from a first actuator current position to a first actuator desired position and moving the second actuator from a second actuator current position to a second actuator desired position by:

a) enabling the lost motion device such that operating the power drive unit moves the first actuator and moves the second actuator via the lost motion device to the second actuator desired position, b) then, whilst the lost motion device is enabled, operating the power drive unit to move the first actuator to the first actuator desired position such that the second actuator remains at the second actuator desired position, and using the second position sensor to determine the position of the first part relative to the second part.

According to an aspect of the present invention there is provided a system for an aircraft wing including a power drive unit, a first actuator for actuating a first aerodynamic device, a second actuator for actuating a second aerodynamic device, a first drive path operably connecting the power drive unit and the first actuator, a second drive path configured to operate between the first drive path and the second actuator, the second drive path including a lost motion device, the lost motion device being configured to selectively operably connect the first drive path to the second actuator and selectively operably disconnect the first drive path from the second actuator wherein the lost motion device has a first part operably connected to the first drive path and a second part operably connected to the second actuator wherein the system includes a first position sensor to determine the position of the first part or the second part relative to a wing and a second position sensor to determine the position of the first part relative to the second part.

The method may include moving the first actuator from a first actuator current position to a first actuator desired position and moving the second actuator from a second actuator current position to a second actuator desired position by:

a) enabling the lost motion device such that operating the power drive unit moves the first actuator and moves the second actuator via the lost motion device to the second actuator desired position, b) then whilst the lost motion device is enabled operating the power drive unit to move the first actuator to the first actuator desired position such that the second actuator remains at the second actuator desired position, and using the second position sensor to determine the position of the first part relative to the second part.

According to an aspect of the present invention there is provided a system for an aircraft wing including a first motor and a second motor, a first actuator for actuating a first aerodynamic device, a second actuator for actuating a second aerodynamic device, a first drive path configured to operate between the first motor and the first actuator and configured to operate between the second motor and the first actuator, a second drive path operably connecting the first motor and the second actuator and operably connecting the second motor and the second actuator, the first drive path including a lost motion device, the lost motion device being configured to selectively operably connect the first and second motors to the first actuator and selectively operably disconnect the first and second motors from the first actuator, the system being configured to:

in a first mode configure both the first and second motors to drive both the first actuator and the second actuator, in a second mode configure only the first motor to drive only the first actuator, and in a third mode configure only the second motor to drive both the first actuator and the second actuator.

The method may include moving the first actuator from a first actuator current position to a first actuator desired position and moving the second actuator from a second actuator current position to a second actuator desired position by:

a) operating the system in the third mode by enabling the lost motion device such that operating the second motor moves the first actuator and moves the second actuator via the lost motion device to the second actuator desired position, b) then, whilst the lost motion device is enabled, operating the system in the second mode by operating the first motor to move the first actuator to the first actuator desired position.

According to an aspect of the present invention there is provided a system for an aircraft wing including a first motor and a second motor, a first actuator for actuating a first aerodynamic device, a second actuator for actuating a second aerodynamic device, a first drive path operably connecting the first motor and the first actuator and operably connecting the second motor and the first actuator, a second drive path configured to operate between the first drive path and the second actuator, the second drive path including a lost motion device, the lost motion device being configured to selectively operably connect the first drive path to the second actuator and selectively operably disconnect the first drive path from the second actuator, the system being configured to:

in a first mode configure both the first and second motors to drive both the first actuator and second actuator, in a second mode configure only the first motor to drive only the first actuator, and in a third mode configure only the second motor to drive both the first actuator and second actuator.

The method may include moving the first actuator from a first actuator current position to a first actuator desired position and moving the second actuator from a second actuator current position to a second actuator desired position by:

a) operating the system in the third mode by enabling the lost motion device such that operating the second motor moves the first actuator and moves the second actuator via the lost motion device to the second actuator desired position, b) then whilst the lost motion device is enabled operating the system in the second mode by operating the first motor to move the first actuator to the first actuator desired position such that the second actuator remains at the second actuator desired position.

According to an aspect of the present invention there is provided a system for an aircraft wing including a first motor and a second motor, a first actuator for actuating a first aerodynamic device, a second actuator for actuating a second aerodynamic device, a first drive path configured to operate between the first motor and the first actuator and configured to operate between the second motor and the first actuator, a second drive path operably connecting the first motor and the second actuator and operably connecting the second motor and the second actuator, the first drive path including a clutch, the clutch being configured to selectively operably connect the first and second motors to the first actuator and selectively operably disconnect the first and second motors from the first actuator, the system being configured to:

in a first mode configure both the first and second motors to drive both the first actuator and the second actuator, in a second mode configure only the first motor to drive only the first actuator, and in a third mode configure only the second motor to drive both the first actuator and the second actuator.

The method may include moving the first actuator from a first actuator current position to a first actuator desired position and moving the second actuator from a second actuator current position to a second actuator desired position by:

a) operating the system in the third mode by enabling the clutch such that operating the second motor moves the first actuator and moves the second actuator via the clutch to the second actuator desired position, b) then, whilst the clutch is enabled, operating the system in the second mode by operating the first motor to move the first actuator to the first actuator desired position.

According to an aspect of the present invention there is provided a system for an aircraft wing including a first motor and a second motor, a first actuator for actuating a first aerodynamic device, a second actuator for actuating a second aerodynamic device, a first drive path operably connecting the first motor and the first actuator and operably connecting the second motor and the first actuator, a second drive path configured to operate between the first drive path and the second actuator, the second drive path including a clutch, the clutch being configured to selectively operably connect the first drive path to the second actuator and selectively operably disconnect the first drive path from the second actuator, the system being configured to:

in a first mode configure both the first and second motors to drive both the first actuator and second actuator, in a second mode configure only the first motor to drive only the first actuator, and in a third mode configure only the second motor to drive both the first actuator and second actuator.

The method may include moving the first actuator from a first actuator current position to a first actuator desired position and moving the second actuator from a second actuator current position to a second actuator desired position by:

a) operating the system in the third mode by enabling the clutch such that operating the second motor moves the first actuator and moves the second actuator via the clutch to the second actuator desired position, b) then whilst the clutch is enabled operating the system in the second mode by operating the first motor to move the first actuator to the first actuator desired position.

The system may be configured to:

in the first mode configure one of the first and second motors to drive both the first actuator and the second actuator in the event of failure of the other of the first and second motors.

According to an aspect of the present invention there is provided a system for an aircraft wing including a first motor and a second motor, a first actuator for actuating a first aerodynamic device, a second actuator for actuating a second aerodynamic device, a first drive path configured to operate between the first motor and the first actuator, a second drive path operably connecting the first motor and the second actuator, the first drive path including a lost motion device, the lost motion device being configured to selectively operably connect the first motor to the first actuator and selectively operably disconnect the first motor from the first actuator, the system being configured to:

in a first mode configure the first motor to drive both the first actuator and second actuator in a second mode configure only the first motor to drive only the first actuator, and in a third mode configure only the second motor to drive only the second actuator.

The method may include moving the first actuator from a first actuator current position to a first actuator desired position and moving the second actuator from a second actuator current position to a second actuator desired position by:

a) operating the system in the second mode by enabling the lost motion device such that operating the first motor moves the first actuator to the first actuator desired position, and b) operating the system in the third mode by enabling the lost motion device and operating the second motor to move the second actuator to the second actuator desired position.

According to an aspect of the present invention there is provided a system for an aircraft wing including first motor and a second motor, a first actuator for actuating a first aerodynamic device, a second actuator for actuating a second aerodynamic device, a first drive path operably connecting the first motor and the first actuator, a second drive path configured to operate between the first drive path and the second actuator, the second drive path including a lost motion device, the lost motion device being configured to selectively operably connect the first drive path to the second actuator and selectively operably disconnect the first drive path from the second actuator, the system being configured to:

in a first mode configure the first motor to drive both the first actuator and second actuator, in a second mode configure only the first motor to drive only the first actuator, and in a third mode configure only the second motor to drive only the second actuator.

The method may include moving the first actuator from a first actuator current position to a first actuator desired position and moving the second actuator from a second actuator current position to a second actuator desired position by:

a) operating the system in the second mode by enabling the lost motion device such that operating the first motor moves the first actuator to the first actuator desired position, and b) operating the system in the third mode by enabling the lost motion device and operating the second motor to move the second actuator to the second actuator desired position.

According to an aspect of the present invention there is provided a system for an aircraft wing including a first motor and a second motor, a first actuator for actuating a first aerodynamic device, a second actuator for actuating a second aerodynamic device, a first drive path configured to operate between the first motor and the first actuator, a second drive path operably connecting the first motor and the second actuator, the first drive path including a clutch, the clutch being configured to selectively operably connect the first motor to the first actuator and selectively operably disconnect the first motor from the first actuator, the system being configured to:

in a first mode configure the first motor to drive both the first actuator and second actuator, in a second mode configure only the first motor to drive only the first actuator, and in a third mode configure only the second motor to drive only the second actuator.

The method may include moving the first actuator from a first actuator current position to a first actuator desired position and moving the second actuator from a second actuator current position to a second actuator desired position by:

a) operating the system in the second mode by enabling the clutch such that operating the first motor moves the first actuator to the first actuator desired position, and b) operating the system in the third mode by enabling the clutch and, operating the second motor to move the second actuator to the second actuator desired position.

According to an aspect of the present invention there is provided a system for an aircraft wing including first motor and a second motor, a first actuator for actuating a first aerodynamic device, a second actuator for actuating a second aerodynamic device, a first drive path operably connecting the first motor and the first actuator, a second drive path configured to operate between the first drive path and the second actuator, the second drive path including a clutch, the clutch being configured to selectively operably connect the first drive path to the second actuator and selectively operably disconnect the first drive path from the second actuator, the system being configured to:

in a first mode configure the first motor to drive both the first actuator and second actuator, in a second mode configure only the first motor to drive only the first actuator, and in a third mode configure only the second motor to drive only the second actuator.

The method may include moving the first actuator from a first actuator current position to a first actuator desired position and moving the second actuator from a second actuator current position to a second actuator desired position by:

a) operating the system in the second mode by enabling the clutch such that operating the first motor moves the first actuator to the first actuator desired position, b) operating the system in the third mode by enabling the clutch and operating the second motor to move the second actuator to the second actuator desired position.

The system may include a third motor, when the system is configured to:

in the first mode configure one of the first and third motors to drive both the first actuator and the second actuator in the event of failure of the other of the first and third motors.

According to an aspect of the present invention there is provided a system for an aircraft wing including a power drive unit, a first actuator for actuating a first aerodynamic device, a second actuator for actuating a second aerodynamic device, a first drive path configured to operate between the power drive unit and the first actuator, a second drive path operably connecting the power drive unit and the second actuator, the first drive path including a lost motion device, the lost motion device being configured to selectively operably connect the power drive unit to the first actuator and selectively operably disconnect the power drive unit from the first actuator.

The lost motion device may have a first part operably connected to the power drive unit and a second part operably connected to the first actuator.

The lost motion device may be configured to have lost motion movement wherein the first part is configured to move in a first direction relative to the second part and/or wherein the first part is configured to move in a second direction relative to the second part.

The lost motion device may be configured to have a first lost motion movement stop configured to limit movement of the first part in the first direction relative to the second part.

The lost motion device may be configured to have a second lost motion stop configured to limit movement of the first part in the second direction relative to the second part.

The first direction may be a first rotational direction and the second direction is a second rotational direction.

The first part may include a first lost motion component with a first thread and the second part includes a second lost motion component with a second thread that is configured to cooperate with the first thread, the first lost motion component being configured to move linearly relative to the second lost motion component when the power drive unit is selectively operably disconnected from the first actuator.

The first part may be prevented from moving in a first linear direction relative to the second part when the power drive unit is selectively operably connected to the first actuator.

The first part may be prevented from moving in a second linear direction relative to the second part when the power drive unit is selectively operably connected to the first actuator.

The first thread and second thread may have a thread pitch and the first component is configured to move linearly relative to the second component by more than the thread pitch.

The system may further include a brake, the brake being configured to selectively operably connect the power drive unit to the first actuator and selectively operably disconnect the power drive unit from the first actuator.

The brake may have a first brake component that is rotationally fast with the first lost motion component and/or the brake has a second brake component that is rotationally fast with the second lost motion component wherein application of the brake causes the first brake component to become rotationally fast with the second brake component.

The method may include moving the first actuator from a first actuator current position to a first actuator desired position and moving the second actuator from a second actuator current position to a second actuator desired position by:

a) enabling the lost motion device such that operating the power drive unit moves the first actuator and moves the second actuator via the lost motion device to the second actuator desired position, b) then, whilst the lost motion device is enabled, operating the power drive unit to move the first actuator to the first actuator desired position such that the second actuator remains at the second actuator desired position.

During step a) the power drive unit may move in a first direction and during step b) the power drive unit may move in a second direction opposite to the first direction.

According to an aspect of the present invention there is provided a system for an aircraft wing including a power drive unit, a first actuator for actuating a first aerodynamic device, a second actuator for actuating a second aerodynamic device, a first drive path operably connecting the power drive unit and the first actuator, a second drive path configured to operate between the first drive path and the second actuator, the second drive path including a lost motion device, the lost motion device being configured to selectively operably connect the first drive path to the second actuator and selectively operably disconnect the first drive path from the second actuator.

The lost motion device may have a first part operably connected to the first drive path and a second part operably connected to the second actuator.

The lost motion device may be configured to have lost motion movement wherein the first part is configured to move in a first direction relative to the second part and/or wherein the first part is configured to move in a second direction relative to the second part.

The lost motion device may be configured to have a first lost motion movement stop configured to limit movement of the first part in the first direction relative to the second part.

The lost motion device may be configured to have a second lost motion stop configured to limit movement of the first part in the second direction relative to the second part.

The first direction may be a first rotational direction and the second direction may be a second rotational direction.

The first part may include a first lost motion component with a first thread and the second part may include a second lost motion component with a second thread that is configured to cooperate with the first thread, the first lost motion component being configured to move linearly relative to the second lost motion component when the first drive path is selectively operably disconnected from the second actuator.

The first part may be prevented from moving in a first linear direction relative to the second part when the first drive path is selectively operably connected to the second actuator.

The first part may be prevented from moving in a second linear direction relative to the second part when the first drive path is selectively operably connected to the second actuator.

The first thread and second thread may have a thread pitch and the first component is configured to move linearly relative to the second component by more than the thread pitch.

The system may further include a brake, the brake being configured to selectively operably connect the first drive path to the second actuator and selectively operably disconnect the first drive path from the second actuator.

The brake may have a first brake component that is rotationally fast with the first lost motion component and/or the brake has a second brake component that is rotationally fast with the second lost motion component wherein application of the brake causes the first brake component to become rotationally fast with the second brake component.

The method may include moving the first actuator from a first actuator current position to a first actuator desired position and moving the second actuator from a second actuator current position to a second actuator desired position by:

a) enabling the lost motion device such that operating the power drive unit moves the first actuator and moves the second actuator via the lost motion device to the second actuator desired position, b) then whilst the lost motion device is enabled operating the power drive unit to move the first actuator to the first actuator desired position such that the second actuator remains at the second actuator desired position.

During step a) the power drive unit may move in a first direction and during step b) the power drive unit may move in a second direction opposite to the first direction.

The lost motion device may be permanently enabled.

A lost motion device is a device which allows a limited amount (or a limited range) of relative movement between two components e.g. it allows only a limited amount or only a limited range of relative movement between two components. The lost motion device does not allow unlimited amounts (or an unlimited range) of relative movement between two components.

A lost motion device allows movement in a first direction of a first component relative to a second component until a first travel limit is reached whereupon further movement in the first direction of the first component will cause movement of the second component in the first direction.

A lost motion device allows movement in a first direction of a second component relative to a first component until a second travel limit is reached whereupon further movement in the first direction of the second component will cause movement of the first component in the first direction.

A lost motion device allows movement in a second direction opposite to a first direction of a first component relative to a second component until a second travel limit is reached whereupon further movement in the second direction of the first component will cause movement of the second component in the second direction.

A lost motion device allows movement in a second direction opposite to a first direction of a second component relative to a first component until a first travel limit is reached whereupon further movement in the second direction of the second component will cause movement of the first component in the second direction.

The invention will now be described by way of example only with reference to the accompanying drawings in which.

Figure 1A:
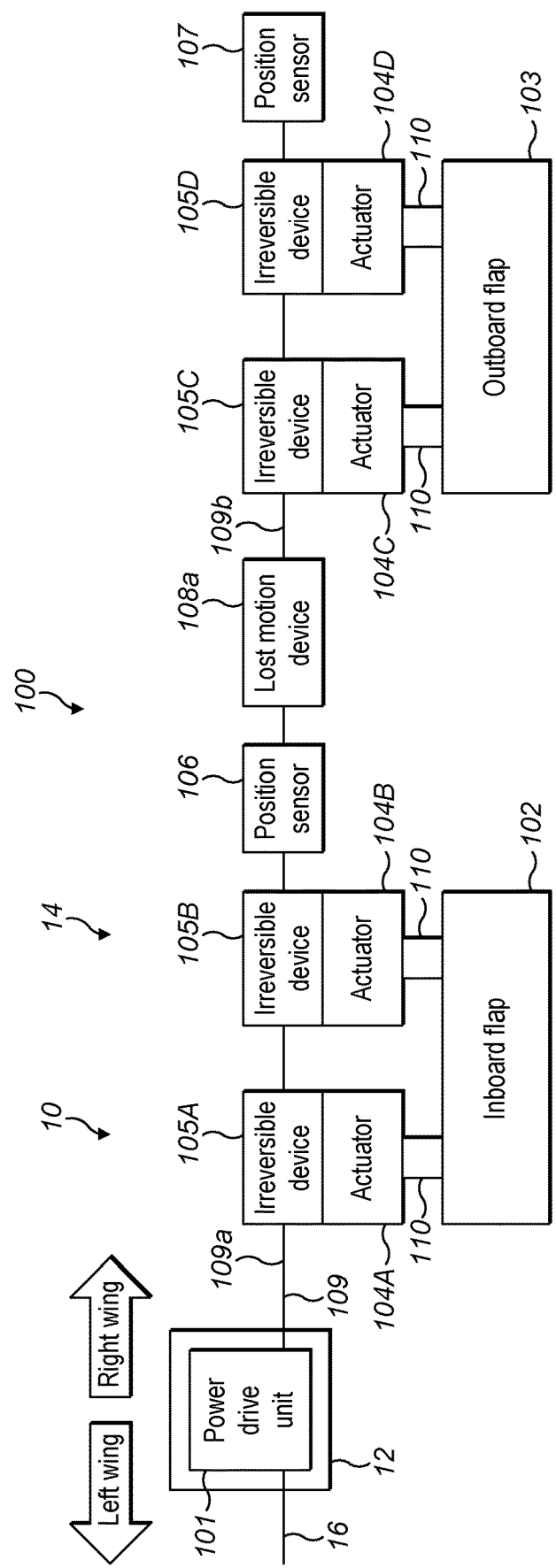
FIG. 1A is a schematic view of a system according to the present invention.
Figure 1B:
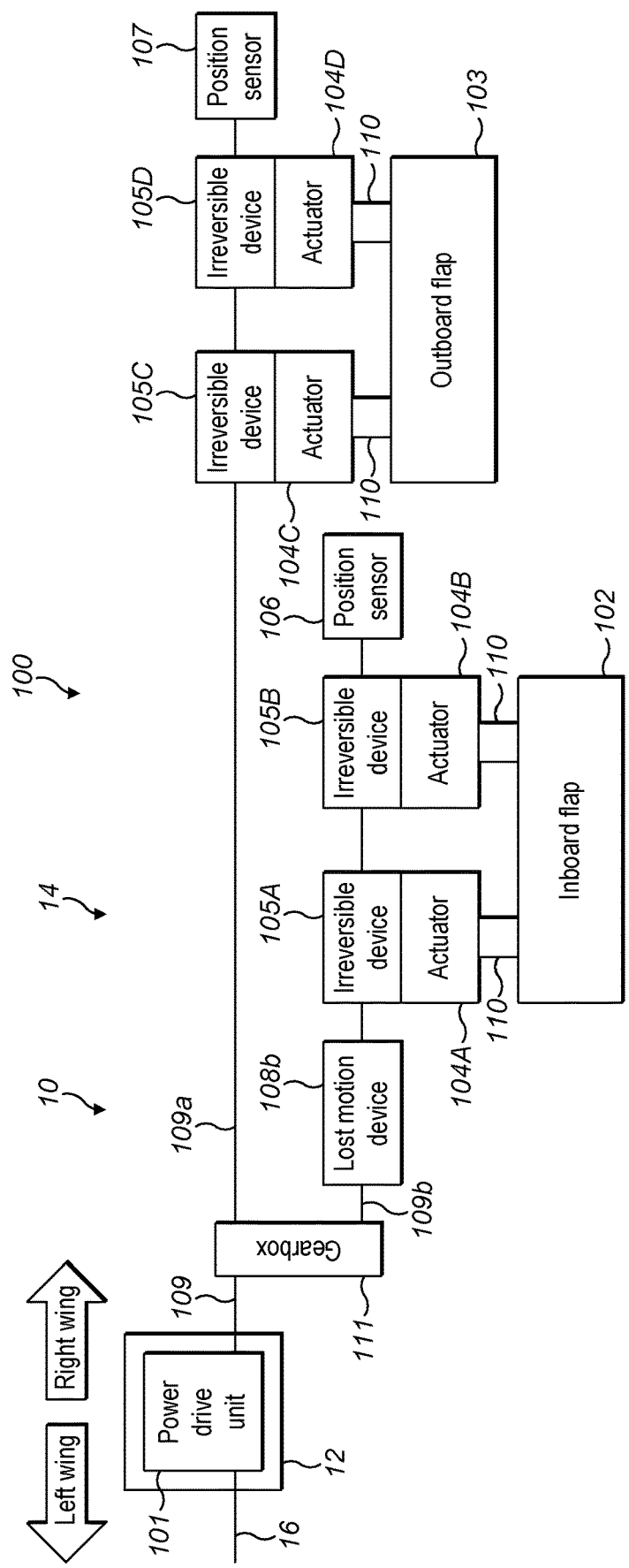
FIG. 1B is a schematic view of a system according to the present invention.
Figure 1C:
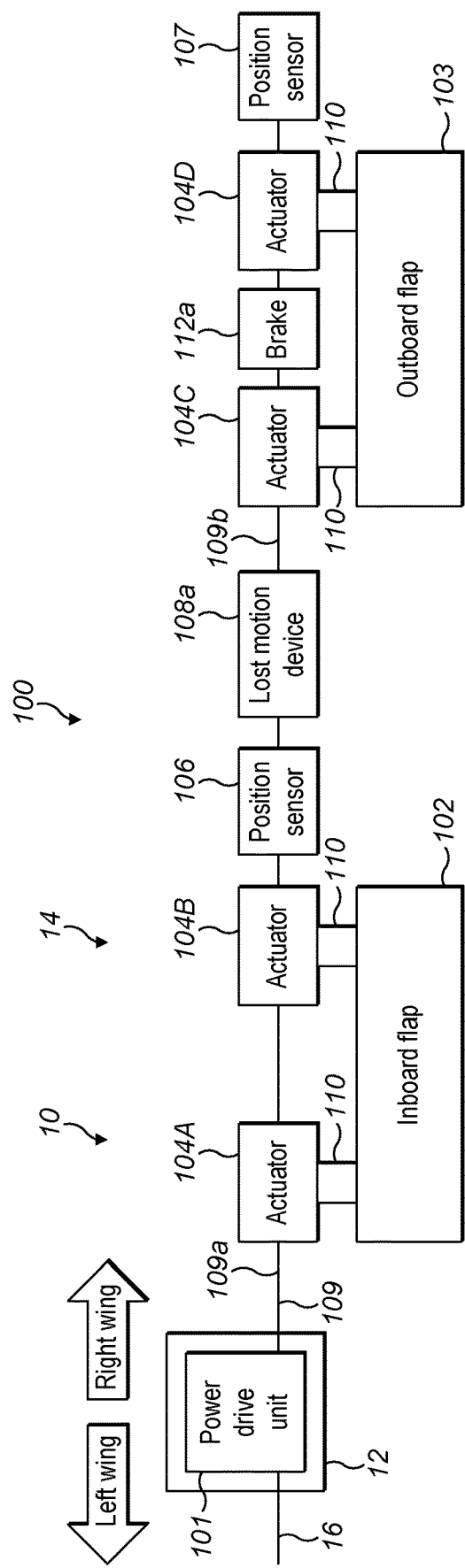
FIG. 1C is a schematic view of a system according to the present invention.
Figure 1D:
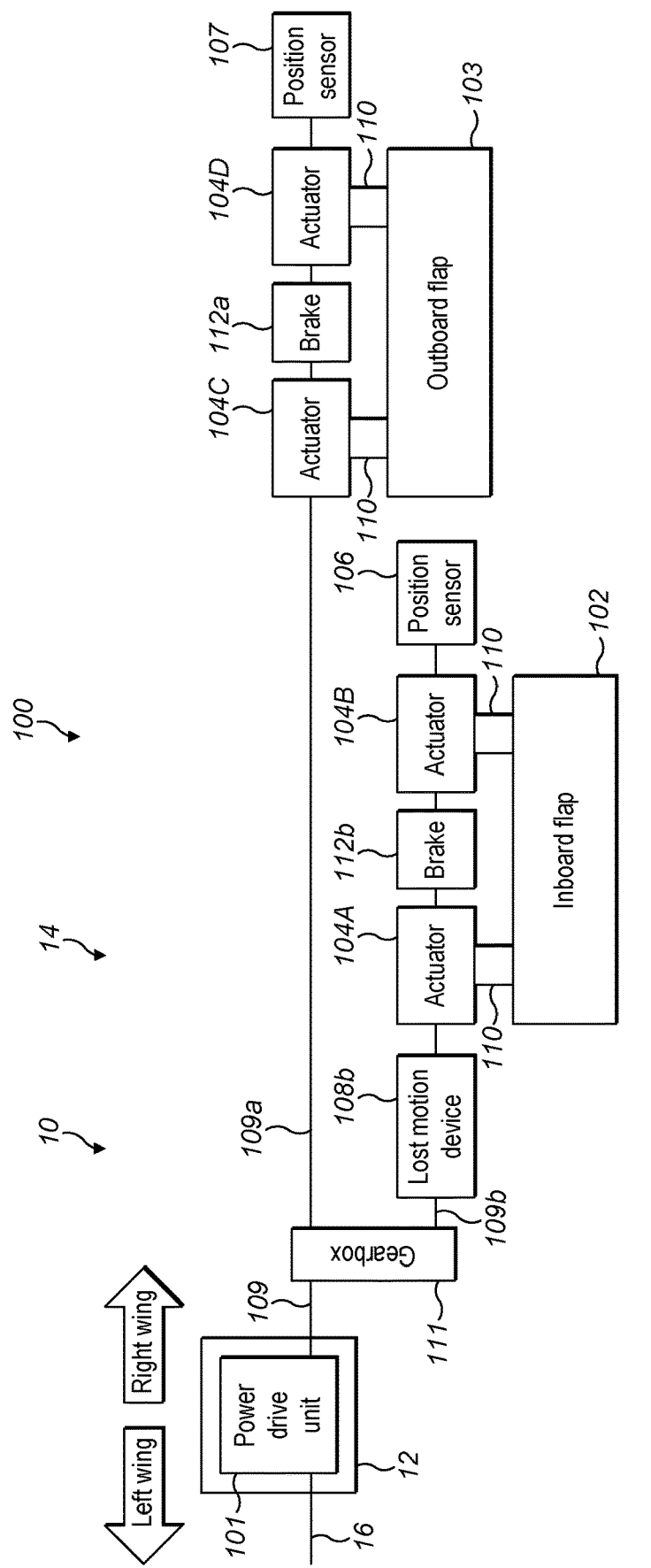
FIG. 1D is a schematic view of a system according to the present invention.
Figure 1E:
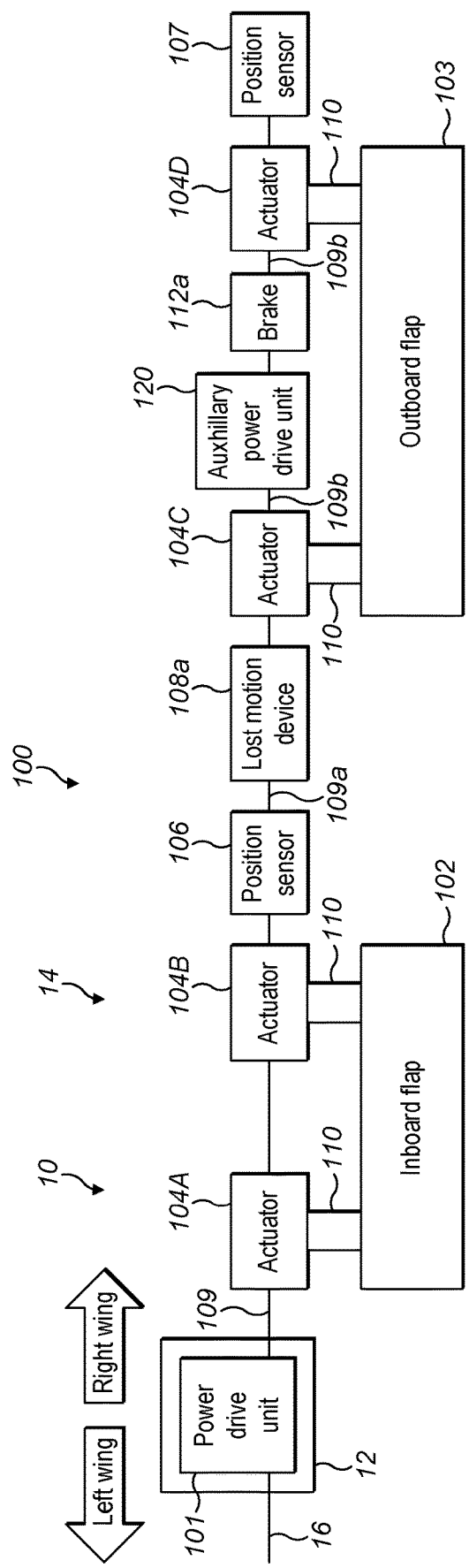
FIG. 1E is a schematic view of a system according to the present invention.
Figure 2:
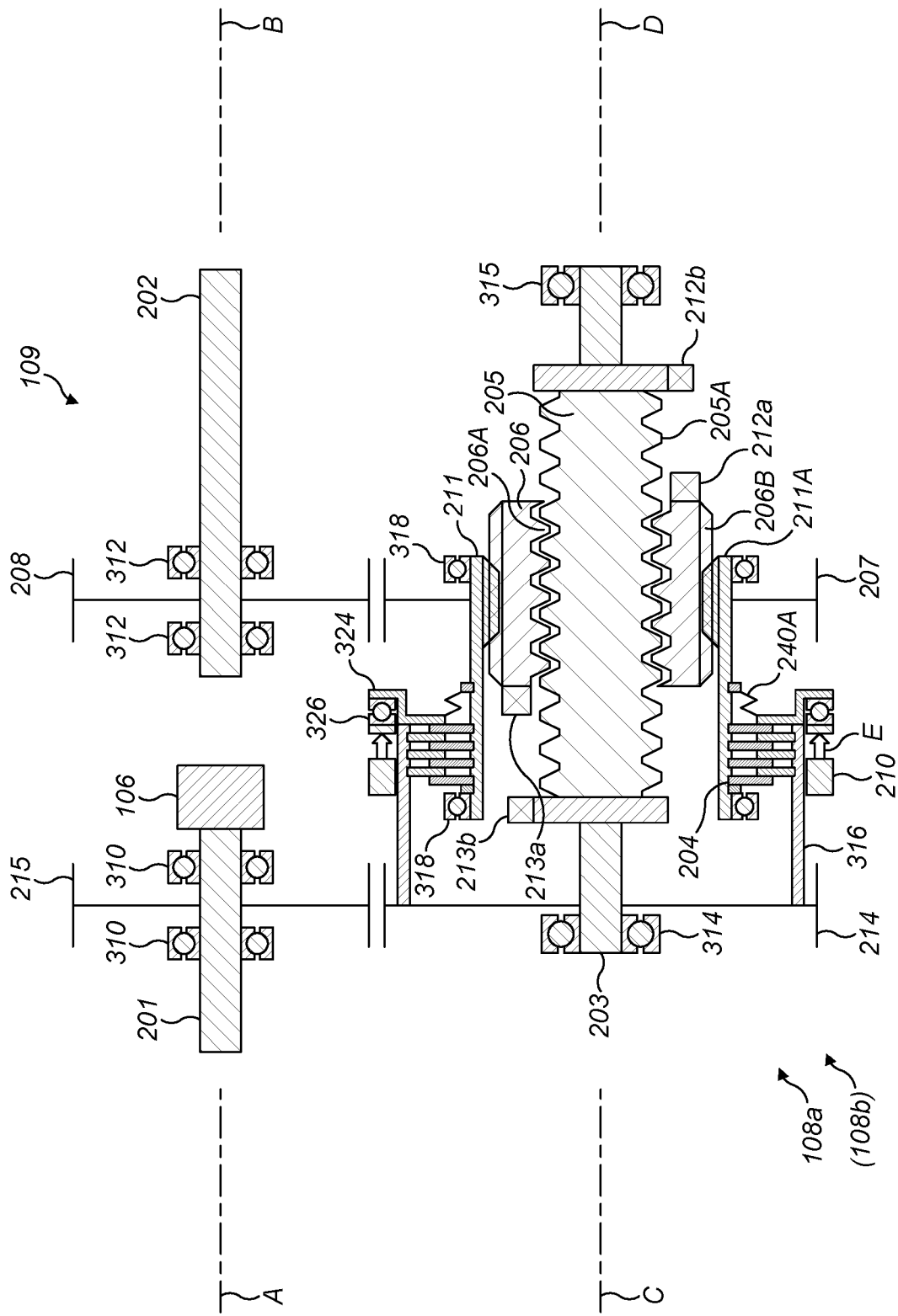
Figure 3:
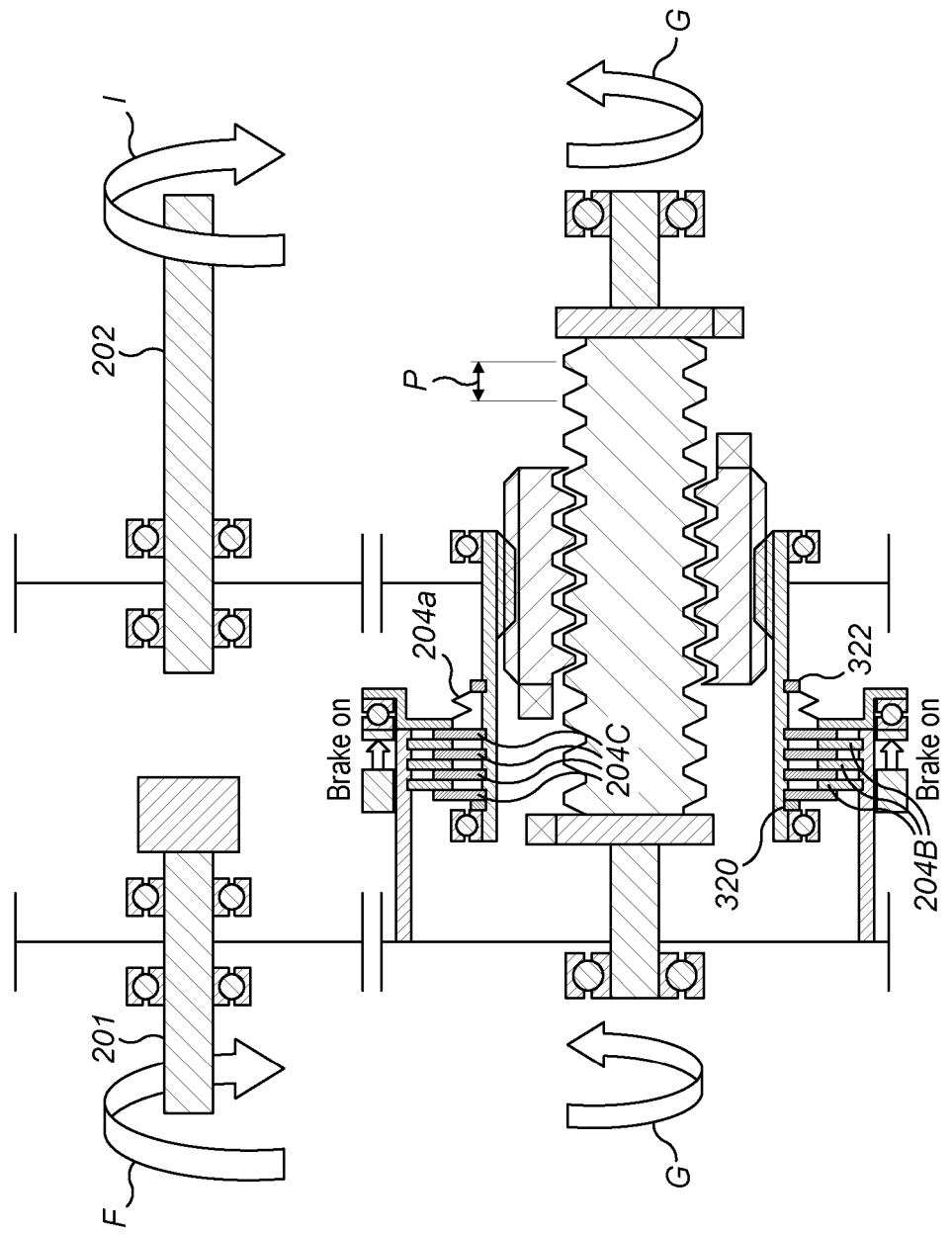
Figure 4A:
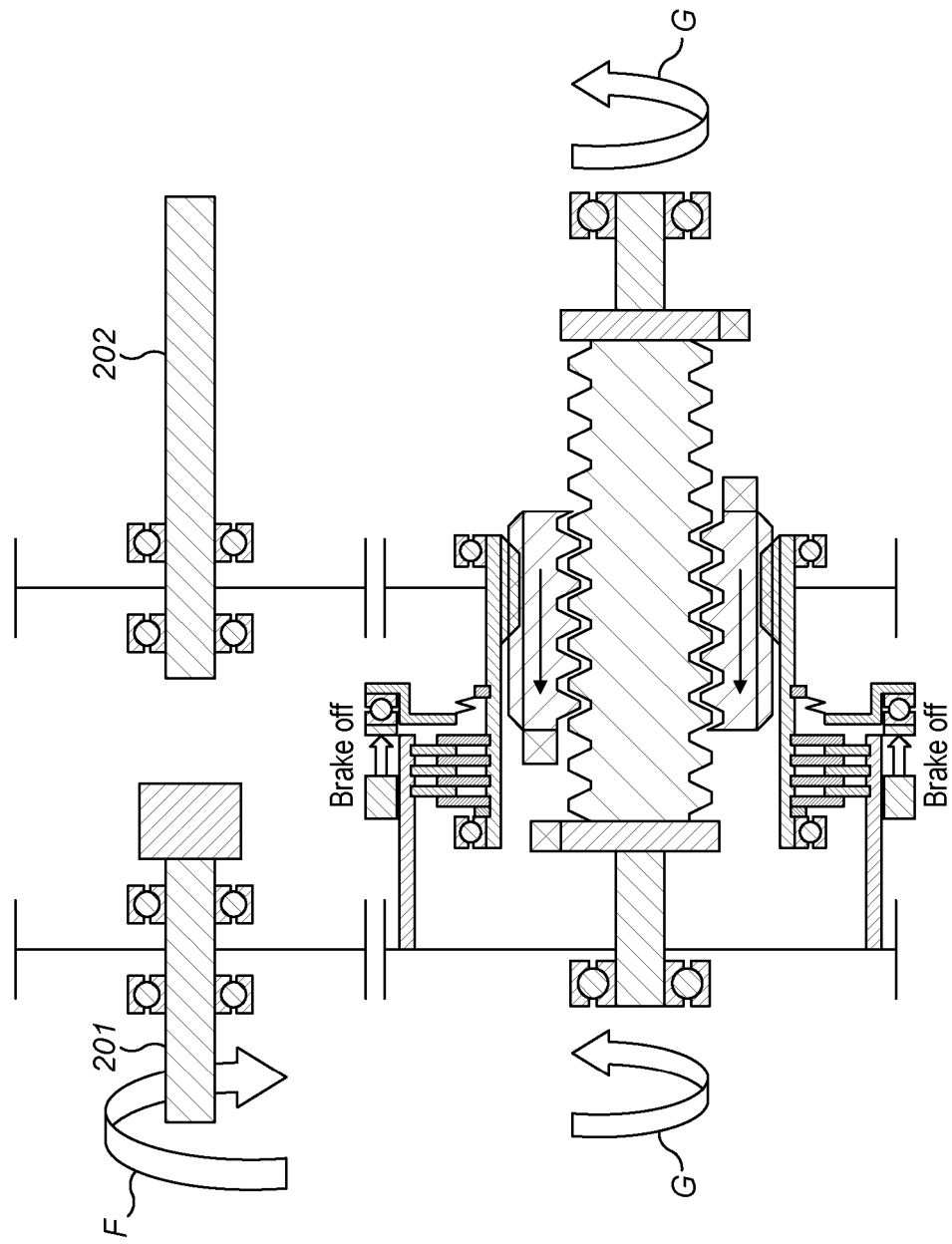
Figure 4B:
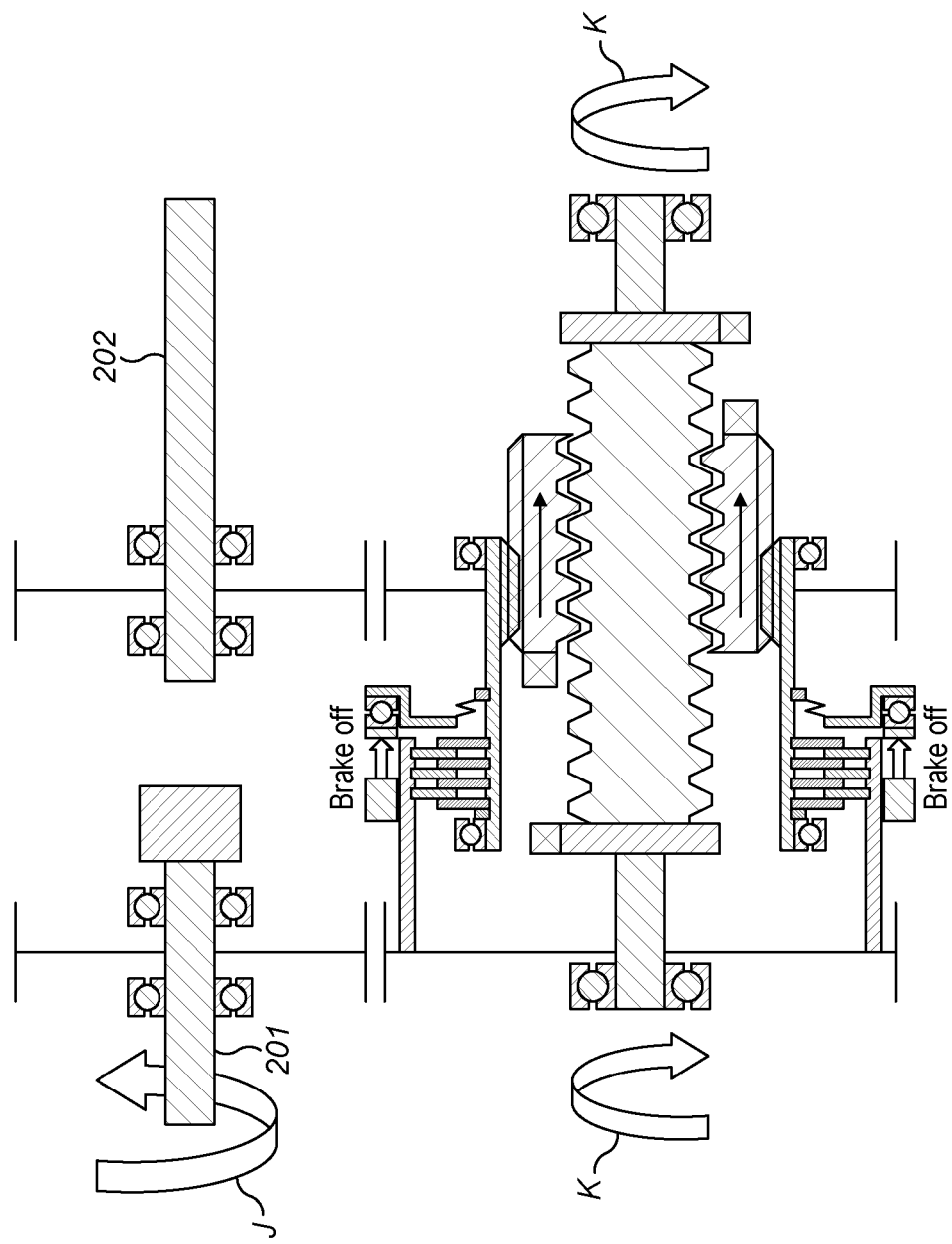
Figure 4C:
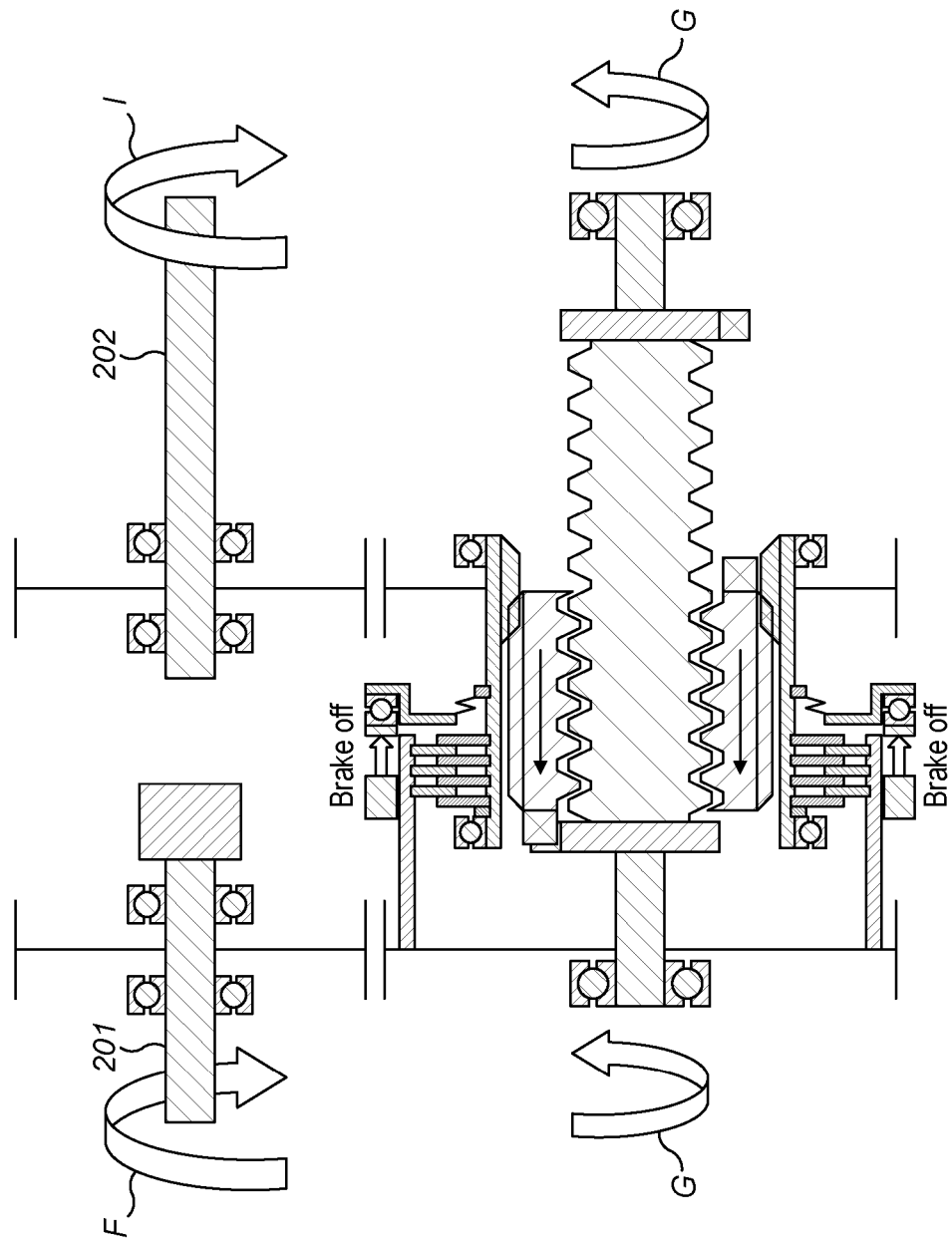
Figure 4D:
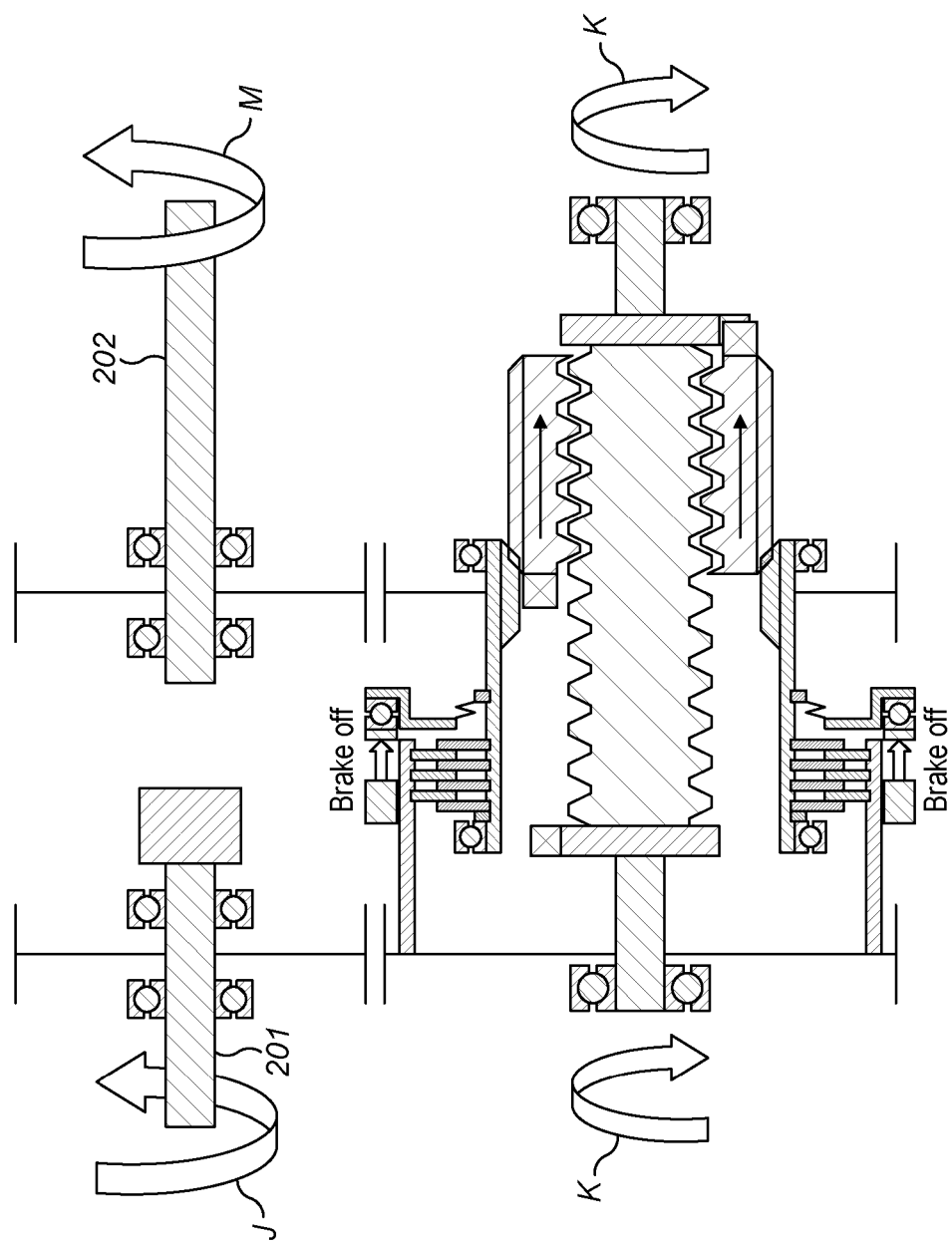
Figure 5A:
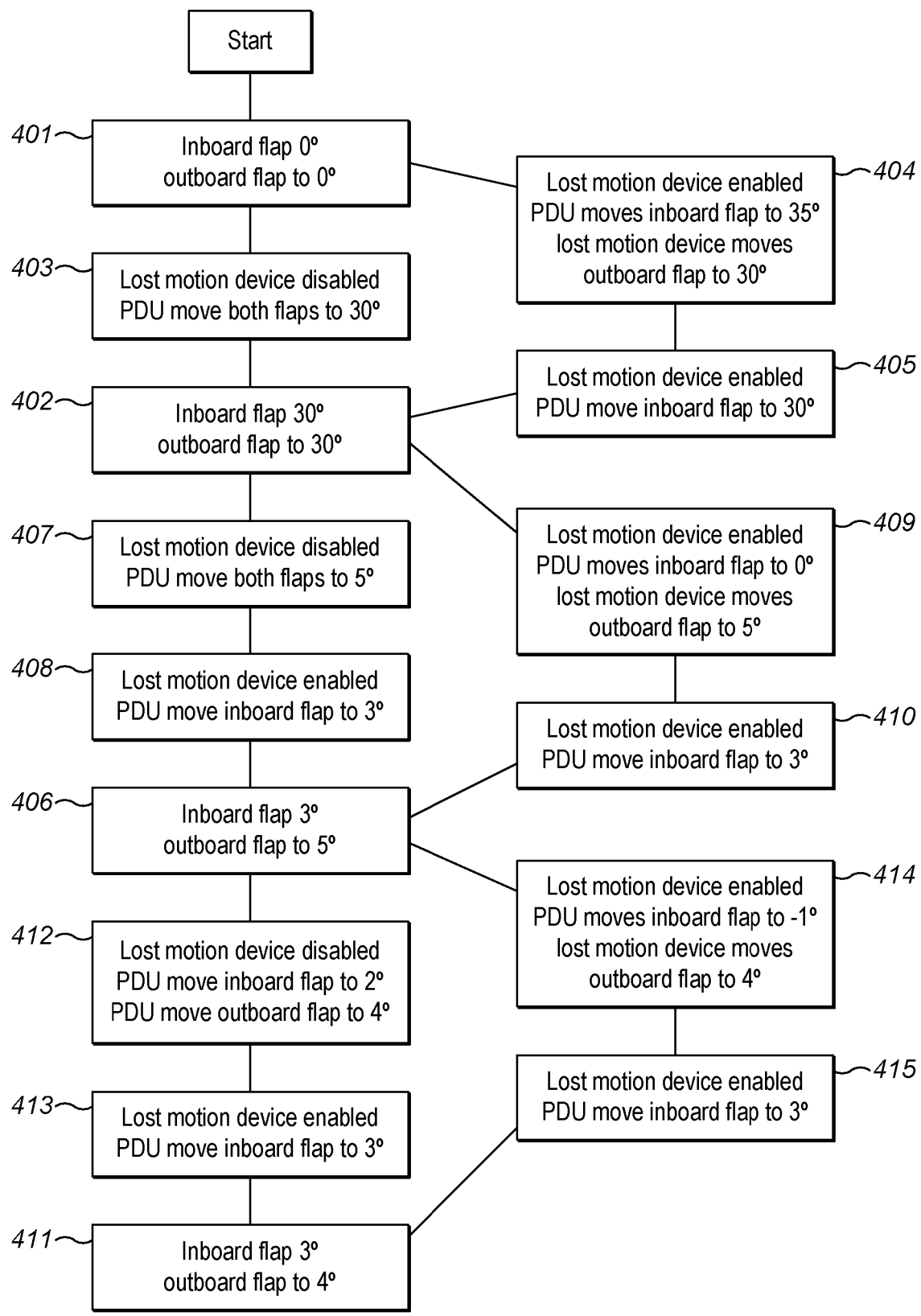
Figure 5B:
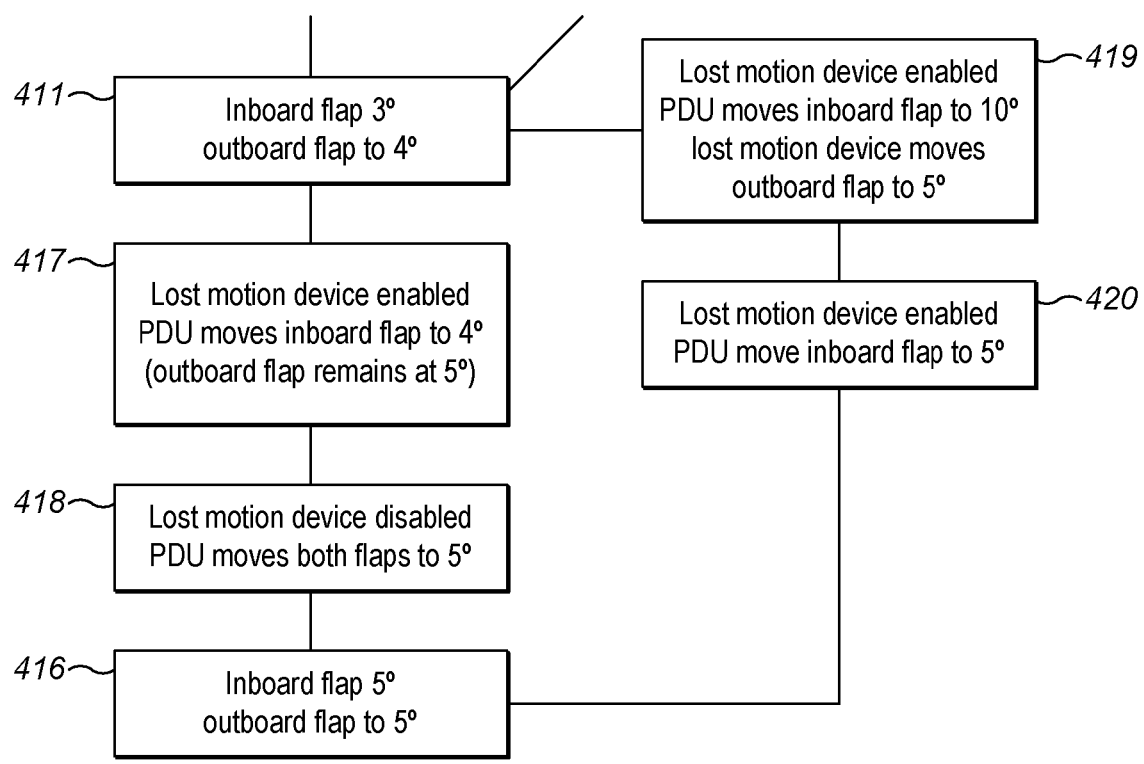
Figure 6:
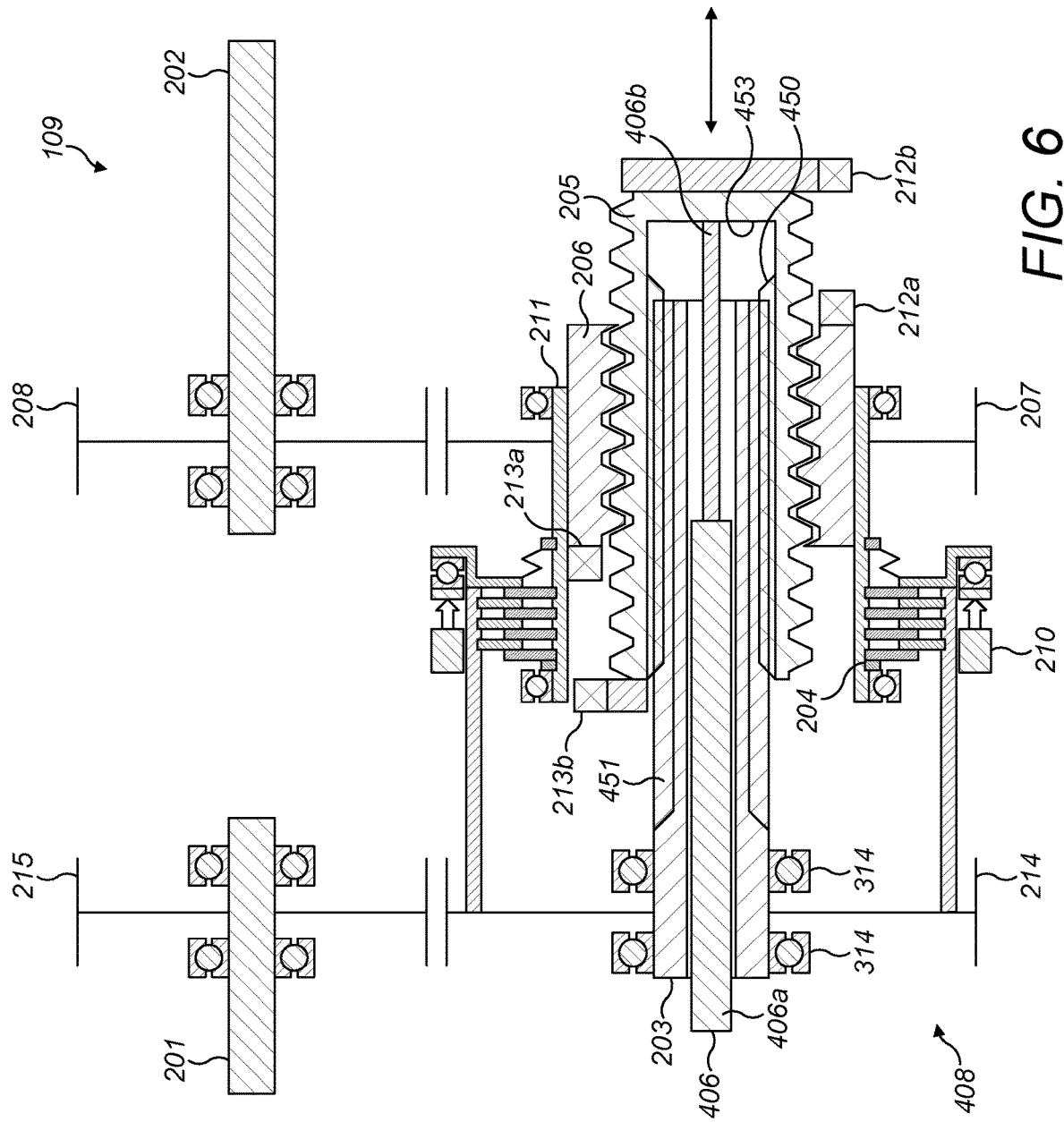
Figure 7:
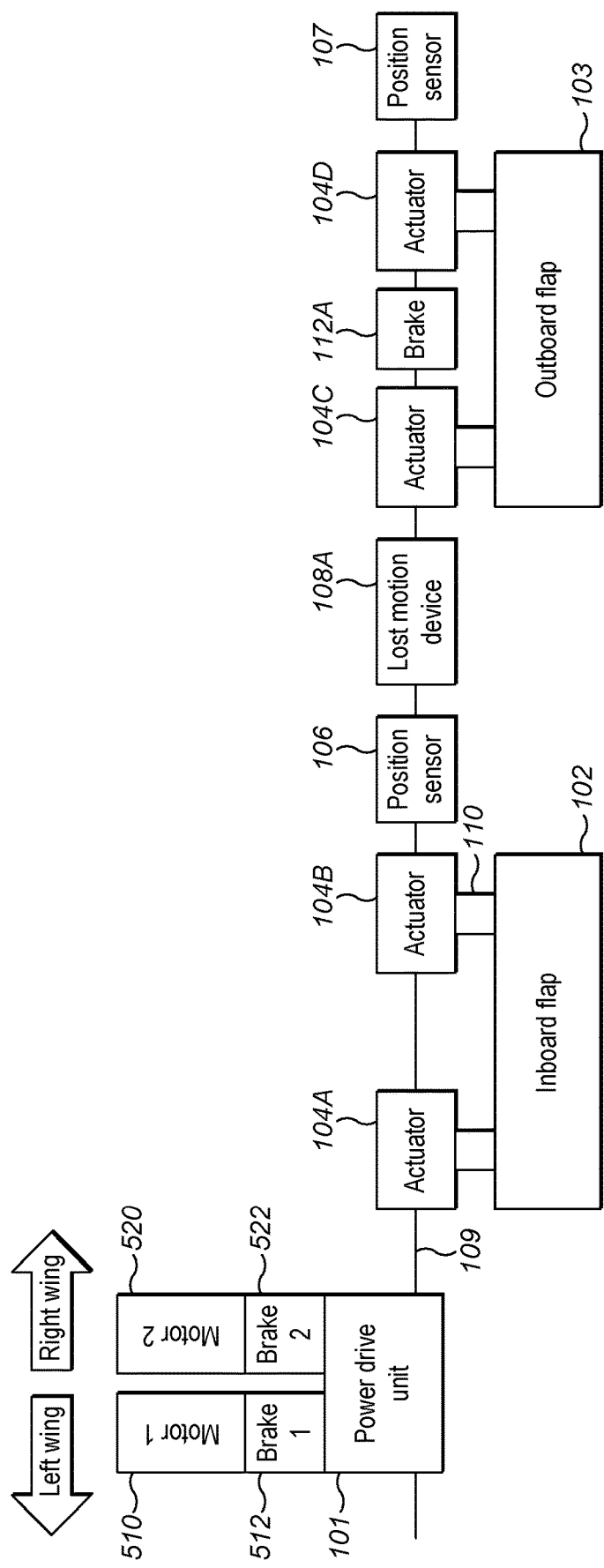
Figure 8:
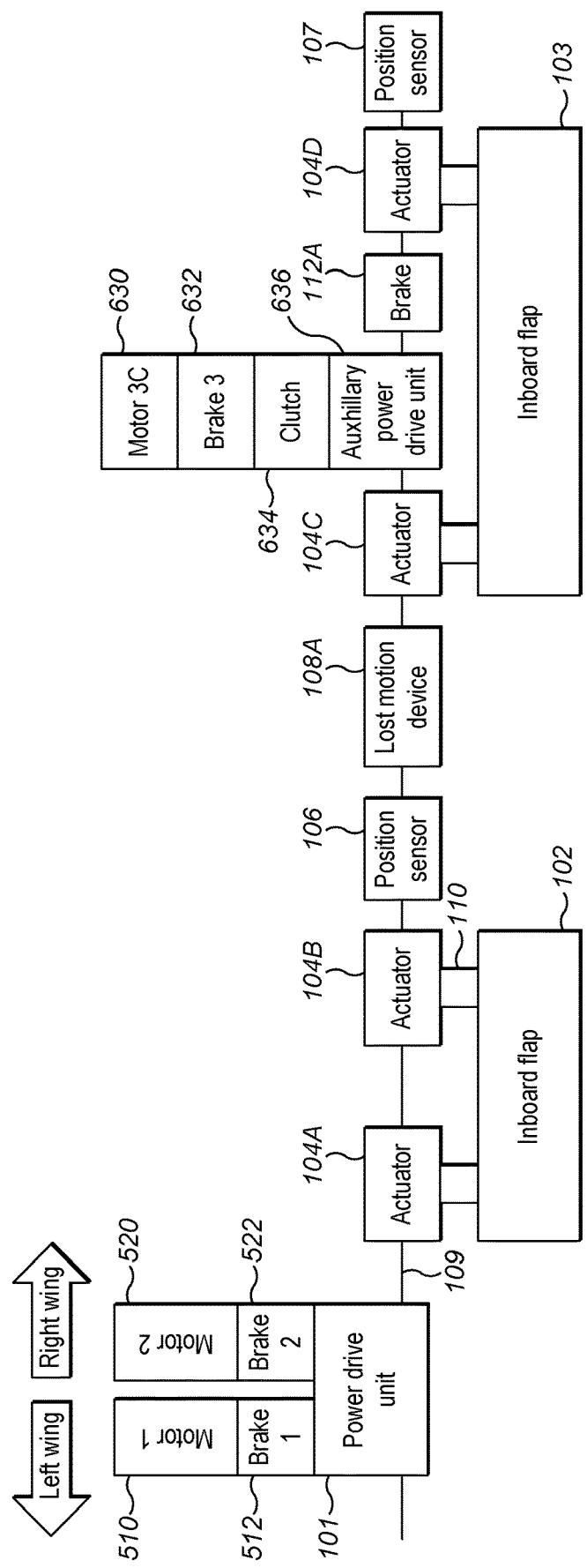

FIG. 2 is a schematic view of a lost motion device for use in the systems of any one of FIGS. 1A to 1E, FIGS. 3, 4A, 4B, 4C, 4D show various operating conditions of the lost motion device of FIG. 2, FIGS. 5A and 5B show different modes of operating the system, FIG. 6 is a schematic view of a lost motion device for use in the systems of any one of FIGS. 1A to 1E, 7 or 8, FIG. 7 is a schematic view of a system according to the present invention, FIG. 8 is a schematic view of a system according to the present invention.

A system 100 for moving aerodynamic devices, such as high lift surfaces of a leading or trailing edge of an aircraft wing is shown in FIG. 1A.

FIG. 1A shows an aircraft 10 (only part of which is shown in schematic form). The aircraft includes a fuselage 12, a right wing 14 and a left wing 16.

The system 100 comprises of two or more lift surfaces as shown in FIG. 1A there is one inboard flap 102 and one outboard flap 103. A centrally located power drive unit (PDU) 101 (located in the fuselage 12) provides drive motion (in this case rotational drive motion) to a set of actuators 104A to 104D via a drive shaft system 109. Each actuator is connected to the flap surface via a linkage 110. The actuator may be of a ballscrew type, geared rotary actuator type, or other such mechanical device converting drive shaft 109 motion to flap motion.

When not in operation brakes (not shown) in the power drive unit 101 prevent motion of the system. In the embodiment shown in FIG. 1 each actuator 104A to 104D also contains corresponding irreversible drive device 105A to 105D often referred to as a noback but may be any form of irreversible gearing or mechanism. The irreversible devices prevents aerodynamic load on the flap surface causing movement of the flap in the event of a failure in the shaft system 109.

Under normal high lift operation the power drive unit 101 provides power to rotate the shaft system 109 which in turn drives the actuators 104A to 104D. All actuators move in unison such as to extend or retract all flap panels on the left and right wing simultaneously. The position of the system is monitored by the position sensor 107 located at the most outboard end of the drive shaft system 109.

The system includes a lost motion device 108a (as will be further described below) located in the shaft system 109 between inboard and outboard actuators. The lost motion device 108a defines a first shaft system 109a and a second shaft system 109b. When the system is required to position the flaps for a differential setting between inboard and outboard surfaces in one embodiment it first moves all surfaces together (as above i.e. the first shaft system 109a moves in unison with the second shaft system 109b) to position the outboard surfaces in their desired location. The lost motion device 108a is then enabled. Enabling of the lost motion device 108a allows the power drive unit to then move just the inboard surfaces (via movement of the first shaft 109a). The position of the inboard flap will be as indicated by the position sensor 106. Once the inboard flap has reached the desired position the lost motion device is disabled. As will be appreciated, as shown in FIG. 1A it is possible to move the inboard and outboard flaps to different relative positions. As shown in FIG. 1A it is not possible to move the outboard surfaces without also moving the inboard surfaces.

Once all differential movements of the inboard and outboard surfaces have been completed the system then moves just the inboard flap surface to match the same position of the outboard flap surface.

The range of movement between inboard and outboard flaps is limited by the lost motion device. This range can be selected such that the aircraft remains in control even with the maximum difference between inboard and outboard surfaces as permitted by the device. This limit provides additional mechanical protection in the event of system failure conditions.

As shown in FIG. 1B, a gearbox 111 is introduced into the shaft system 109. This creates a split in the shaft system such that the first shaft system 109a drives the outboard actuators and the second shaft system 109b drives the inboard actuators. This arrangement reverses the ability to move the inboard and outboard flaps differentially compared to FIG. 1A. When the lost motion device 108b is disabled both inboard and outboard surfaces move together. When the lost motion device 108b is enabled the power drive unit 101 can move the outboard flap surface alone, or can move both flap surfaces. In this second embodiment it is not possible to move the inboard surfaces without also moving the outboard surfaces.

As shown in FIG. 1C the irreversible devices 105C and 105D of FIG. 1A have been replaced with a shaft brake 112a. In normal operation a power drive unit brake (not shown) in the power drive unit 101 and shaft brake 112a are released to permit motion of the system. In the event of a shaft failure the brake in the power drive unit is applied to hold the inboard portion of the system fixed and the shaft brake 112a is applied to hold the outboard portion of the system fixed.

When it is desired to move the inboard flap only, the power drive unit brake is released whilst the shaft brake 112a remains applied. The lost motion device 108a is enabled permitting limited differential movement between inboard and outboard flap surfaces. In this third embodiment it is not possible to move the outboard surfaces without also moving the inboard surfaces.

FIG. 1D is similar to the system of FIG. 1B. In this embodiment, when the lost motion device is enabled, the outboard flap surface may be moved without moving the inboard flap surface. An additional brake 112b is included in this system to prevent uncontrolled motion of the inboard flap surface in the event of a failure in the second shaft system 109b or gear box 111. In this fourth embodiment it is not possible to move the inboard surfaces without also moving the outboard surfaces.

FIG. 2 shows an embodiment of a lost motion device 108a. When used in conjunction with the system of FIG. 1, the shaft 201 is connected to the first shaft system 109a. The shaft 202 is connected to the second shaft system 109b. In one mode of operation drive is transmitted from the first shaft system 109a to the second shaft system 109b via the gears 214 and 215, the brake 204 and gears 207 and 208. In this condition the brake 204 is applied and the lost motion device is disabled.

In more detail, shaft 201 is rotatable about axis A via bearings 310. Gear 215 is rotatably fast with shaft 201, and therefore is also rotatable about axis A.

Shaft 202 is rotatable about axis B via bearings 312. Gear 208 is rotatably fast with shaft 202 and hence also rotates about axis B as shaft 202 rotates about axis B.

Screw 205 includes a screw thread 205A having a pitch P. In this case the screw thread 205A is a single start screw thread and hence the pitch P is the distance between adjacent thread peaks. In further embodiments the screw thread 205A may be a double start screw thread, in which case the pitch will be twice the distance between adjacent thread peaks. Similarly, with a three start thread, the pitch will be three times the distance between adjacent thread peaks. Threads with more thread starts will have a corresponding greater pitch.

The screw 205 is non rotatably secured to shaft 203 which in turn is rotatably mounted in bearings 314 and 315. The screw 205 and shaft 203 therefore are able to rotate about axis C. A gear 214 is non-rotatably fixed to the left hand part of shaft 203 (when viewing FIG. 2), and as such gear 214 also rotates about axis C when screw 205 is rotated.

The screw 205 also includes a rotation stop 212B and a rotation stop 213B, which will be further describe below.

Gear 214 includes a brake plate basket 316. Mounted on brake plate basket 316 is an actuator 210. The brake plate basket includes internal splines which are engaged by external tabs on brake plates 204B. As such brake plates 204B are rotatably fast with the brake plate basket 316, but are axially slideable relative to the brake plate basket 316 so as to be able to apply and release the brake as will be further described below.

Shaft 211 is rotatably mounted on bearings 318 and as such shaft 211 is rotatable about axis D, which in this case is concentric with axis C. Shaft 211 includes external abutments 320 and 322. Brake plates 204C include internal tabs which are located in external splines of shaft 211. As such brake plates 204C are rotationally fast with shafts 211, but can move axially relative to shaft 211 so as to be able to apply and release the brake as will be further described below.

Also mounted on shafts 211 is a pressure plate 324 and a spring 204A.

As can be seen from FIG. 2, brake plates 204B are interleaved with brake plates 204C.

As shown in FIG. 3 spring 204A abuts at one end external abutment 322 and at another end the pressure plate 324. The leftmost brake plate 204C abuts external abutment 320, and as such, with the actuator 210 de-energised the spring clamps the brake plates 204B and 204C together, thereby applying a brake. As will be further described below, the actuator can apply a force in the direction of arrow E, which acts on bearing 326 which in turn pushes pressure plates 324 to the right when viewing FIG. 2 thereby compressing spring 204A and unclamping the brake plates 204B and 204C, thereby releasing the brake.

The shaft 211 also includes an internal spline 211A.

A nut 206 includes an internal screw thread 206A which cooperates with screw thread 205A. The nut has an external spline 206B which cooperates with internal spline 211A of shaft 211. As such, nut 206 is rotationally fast with shaft 211 but can move axially relative to shaft 211.

Nut 206 also includes rotation stop 212A and rotation stop 213A.

Gear 207 is rotationally fast with shaft 211.

As can be seen from FIG. 2, gear 215 engages gear 214. Similarly, gear 208 engages gear 207.

When the actuation device 210 is energised it releases the brake 204 as described above. The actuation device 210 may be electrical, hydraulic or other power source. Drive is now disconnected between gear 215 and gear 207. Shaft 203 drives screw 205 causing the nut 206 to move axially. The nut 206 may slide axially in the shaft 211 via the spline or similar joint without causing rotation of shaft 211. In this manner the shaft 203 may continue to rotate without causing rotation of the shaft 211. The rotational position of shaft 203 is measured by the sensor 106.

If the lost motion travel limit of the nut 206 moving in the right direction (when viewing FIG. 2) is reached then the rotation stop 212a abuts the rotational stop 212b connected to shaft 203. Shaft 203 and nut 211 then rotate together causing rotation of the shaft 202 of the lost motion device via gears 207 and 208. This provides a mechanical limit to the lost motion device in one direction.

If the lost motion travel limit of the nut 206 moving in the left direction is reached then the rotation stop 213a abuts the rotational stop 213b connected to shaft 203. This provides a mechanical limit to the lost motion device in the opposite direction.

FIG. 3 shows the lost motion device in a disabled condition. The actuator 210 is de-energised causing the brake 204 to be applied (via spring 204a clamping brake plates 204b and 204c together as described above). Motion is transmitted between shaft 201 and shaft 202 even though the nut 206 is approximately in the middle of its lost motion travel (in particular rotation stop 212A is not in engagement with rotation stop 212B and rotation stop 213A is not in engagement with rotation stop 213B).

FIG. 4A shows the lost motion device configured such that shaft 201 moves in the direction of arrow F shaft 203 moves in the direction of arrow G and shaft 202 does not move. The actuator 210 is energised thereby compressing spring 204a and unclamping plates 204b and 204c thereby causing the brake 204 to be released and causing the lost motion device to be enabled. Initial motion is not transmitted between shaft 201 and shaft 202. Shaft 202 does not rotate. Nut 206 translates to the left. Continued translation of nut 206 to the left results in the configuration shown in FIG. 4C.

FIG. 4C shows the lost motion device configured to move the shaft 201 and 202 in one direction (see arrows F and I). The actuator 210 is energised causing the brake 204 to be released and the lost motion device to be enabled. The range of lost motion has been reached causing stop 213a to abut stop 213b. Motion is transmitted between shaft 201 and shaft 202.

FIG. 4B shows the lost motion device configured such that shaft 201 moves in the direction of arrow J, shaft 203 moves in the direction of arrow K but shaft 202 does not move. The actuator 210 is again energised causing the brake 204 to be released. Initial motion is not transmitted between shaft 201 and shaft 202. Outboard shaft 202 does not rotate. Nut 206 translates to the right. Continued translation of nut 206 to the right results in the configuration shown in FIG. 4D.

FIG. 4D shows the lost motion device configured to move the shaft 201 and 202 in the other direction (see arrows J and M). The actuator 210 is energised causing the brake 204 to be released and the lost motion device to be enabled. The range of lost motion has been reached causing stop 212a to abut stop 212b. Motion is transmitted between shaft 201 and shaft 202.

As will be appreciated, with the brake 204 applied, movement of shaft 201 in the direction of arrow F causes shaft 202 to rotate in the same direction I and movement of shaft 201 in an opposite direction J similarly causes shaft 202 in an opposite direction M.

With the brake disabled, and hence the lost motion device enabled, nevertheless in the configuration shown in FIG. 4C rotation of shaft 201 in direction F causes rotation of shaft 202 in the same direction. Similarly, in the configuration shown in FIG. 4D with the brake released and hence the lost motion device enabled, nevertheless rotation of shaft 201 in direction of arrow J causes rotation of shaft 202 in the same direction. Thus, as shown in FIGS. 3, 4C and 4D there is synchronous movement of shaft 201 and 202.

However, as shown in FIGS. 4A and 4B (when the brake is released and rotation stop 212A is not engaged with rotation stop 212B and rotation stop 213A is not engaged with rotation stop 213B) these arrangements cause differential movement between shaft 201 and 202. Thus, as shown in FIG. 4, a shaft 201 rotates in the direction of arrow F but shaft 202 does not rotate. As shown in FIG. 4B shaft 201 rotates in the direction of arrow J but shaft 202 does not rotate. Synchronous movement of shafts 201 and 202 causes synchronous movement of the first shaft system 109A and the second shaft system 109B, which in turn causes synchronous movement of inboard flap 201 and outboard flap 203. Differential movement of shafts 201 and 202 causes differential movements of the first shaft system 109A and second shaft system 109B, which in turn causes differential movement of the inboard flap 201 and outboard flap 203.

For the purposes of explanation, assume that during synchronous movement of the inboard flap and the outboard flap, both flaps move through the same angle. Thus, during synchronous movement, if the inboard flap moves one degree, then the outboard flap moves one degree in the same direction. Similarly, during synchronous movement if the inboard flap moves 30 degrees, then the outboard flap moves 30 degrees in the same direction.

Again, for the purposes of explanation, assume that the lost motion travel of the lost motion device (i.e. the travel of nut 206 from the FIG. 4C position to the FIG. 4D position) results in a 5 degree offset between the inboard flap and outboard flap.

When the aircraft is being operated, the inboard and outboard flap will have a current position. In order to initiate a flight manoeuvre, it will be necessary to move the inboard and outboard flap to a desired flap position. The present invention provides a method of moving an inboard and outboard flap from a current flap position to a desired flap position.

FIG. 5 shows how flaps of FIG. 1A may be moved from a current flap position to a desired flap position. Note that the examples are used to indicate how the flaps can be used and are not necessarily indicative of how the flaps will be moved during a flight.

For purposes of explanation, assume the start condition is as shown at 401 with the inboard flap set at 0 degrees, the outboard flap set at 0 degrees and the lost motion nut being positioned as shown in FIG. 2, i.e. in a mid position wherein rotation stop 212A is not engaged with rotation stop 212B and rotation stop 213A is not engaged with rotation stop 213B.

Assume that starting at the current flap position shown at 401, a desired flap position is as shown in 402 wherein the inboard flap is positioned at 30 degrees and the outboard flap is also positioned at 30 degrees. The position shown in FIG. 402 could be used during take-off (or landing). Two options are available to move from flap position 401 to flap position 402. Firstly, the lost motion device could be disabled by applying brake 204. Under these circumstances the power drive unit 101 would rotate the first shaft system 109A such that the inboard flap 102 moves to a 30 degree position.

During movement of the inboard flap the second shaft system 109B would move the outboard flap in a synchronous manner to 30 degrees (see step 403). Thus in these circumstances both flaps are moved synchronously.

An alternative manner of moving the flaps from the 401 position to the 402 position would be to enable the lost motion device and arrange for the power drive unit to move the inboard flap to 35 degrees. Because the lost motion device in this example is configured to have a 5 degree lag between the flaps, the outboard flap would move to 30 degrees. This position equates to position 404.

In order to move to the 402 position from the 404 position the lost motion device would remain enabled and the power drive unit would operate to move the first shaft system 109A in a reverse direction, thereby moving the inboard flap back to 30 degrees. Because of the 5 degree lag between movement of the inboard and outboard flap creates by the lost motion device, the outboard flap would not move.

Having achieved the 402 position, the 402 position then becomes a "current" flap position. Once take-off has been achieved, the flaps will typically be retracted and in this example a desired flap position is shown in FIG. 406 when the inboard flap is set at 3 degrees whereas the outboard flap is set at 5 degrees. As shown in FIG. 5, there are two options for moving from the 402 position to the 406 position. One option is to move to the 407 position by disabling the lost motion device and arranging the power drive unit to move both flaps to 5 degrees. From there it is possible to enable the lost motion device as shown at step 408 such that the power drive unit only moves the inboard flap to 3 degrees. Alternatively, it is possible to move from the 402 position to the 406 position by step 409 wherein the lost motion device is enabled and the power drive unit moves the inboard flap to zero degrees and hence moves the outboard flap to 5 degrees. Step 410 then keeps the lost motion device enabled but the PDU moves the inboard flap to 3 degrees.

Position 406 then becomes a current flap position. If during cruise it is necessary to adjust the camber of the wing, then a desired flap position may be as shown at step 411 wherein the inboard flap remains at 3 degrees whereas the outboard flap is moved to 4 degrees. Again there are two options for moving from the 406 position to the 411 position. The first option is shown as step 412 wherein the lost motion device is disabled and the power drive unit moves the inboard flap to 2 degrees and the outboard flap to 4 degrees, followed by step 413 wherein the lost motion device is enabled and the PDU moves the inboard flap to 3 degrees. Alternatively, flaps can be moved from the 406 position to the 411 position via step 414 when the lost motion device is enabled, the PDU moves the inboard flap to −1 degrees and the lost motion device moves the outboard flap to 4 degrees, followed by step 415 wherein the lost motion device is enabled and PDU moves the outboard flap to 3 degrees.

Once the position shown at 411 has been achieved, this position becomes a current flap position and a desired flap position may be as shown at 416 when the inboard flap is at 5 degrees and the outboard flap at 5 degrees. There are two options for moving from the 411 position to the 416 position. Firstly, as shown in step 417 lost motion device may be enabled with the PDU moving inboard flap to 4 degrees, whilst the outboard flap remains at 4 degrees. The lost motion device is then disabled as shown in step 418 and the PDU moves both the inboard and outboard flaps synchronously to 5 degrees.

Alternatively, step 419 shows the lost motion device being enabled such that the PDU moves the inboard flap to 10 degrees and the lost motion device moves the outboard flap to 5 degrees. Step 420 then enables the lost motion device such that the PDU moves just the inboard flap to 5 degrees.

As will be appreciated, with the brake applied, synchronous movement of the inboard and outboard flaps occurs. Step 403 shows synchronous movement between the position shown at 401 and 402. However, consideration of steps 404 and 405 show that it is possible to move from the 401 position to the 402 position without the brake being applied. Thus, in one embodiment, in the event that the brake fails, it is still possible to move from the 401 position to the 402 position. In an alternative embodiment, since it is possible to move from the 401 position to the 402 position without the use of a brake, an aircraft may include the lost motion device according to the present invention but may not include a brake. Note that it is possible to move from the 401 position to the 402 position and to the 406 position and to the 411 position and to the 416 position without using the brake (see steps 404, 405, 409, 410, 414, 415, 419 and 420).

FIG. 3 shows the thread pitch P. In this example the thread is a single start thread. Therefore it requires six revolutions of shaft 203 to move from the FIG. 4C position to the FIG. 4D position (there being six thread peaks on screw thread 205A to the right of nut 206 when viewing FIG. 4C). Thus the nut moves linearly relative to the screw by more than the thread pitch (in this case six times more than the thread pitch). In order to provide sufficient lost motion travel, it is advantageous for one threaded component of a lost motion device to move by more than the thread pitch relative to a second component of the lost motion device. For this to happen, one of the threaded components must rotate by more than one revolution relative to the other threaded component.

The lost motion device 108A and the manner of operation as shown in FIGS. 5A and 5B have been described with respect to FIG. 1A.

Components shown in FIG. 1C which fulfil substantially the same function as those shown in FIG. 1A have been labelled similarly. Operation of the lost motion device shown in FIG. 1C is similar to operation of the lost motion device shown in FIG. 1A, in particular operation as shown in FIGS. 5A and 5B apply equally to FIG. 1C.

As shown in FIGS. 1A and 1C, drive path 109A operably connects the power drive unit with actuators 104A and 104B. A second drive path 109B is configured to operate between the first drive path 109A and the actuators 104C and 104D. The second drive path 109B includes the lost motion device 108A. The lost motion device is configured to selectably operably connect the first drive path 109A to actuators 104C and 104D. The lost motion device is also configured to selectively operably disconnect the first drive path 109A from the actuators 104C and 104D.

Components in FIG. 1B which fulfil substantially the same function as those shown in FIG. 1A are labelled the same. Components shown in FIG. 1D which fulfil substantially the same function as those shown in FIG. 1C are labelled the same. As shown in FIGS. 1B and 1D a first drive path 109B is configured to operate between the power drive unit and actuators 104A and 104B. A second drive path 109A operably connects the power drive unit and the actuators 104C and 104D.

The first drive path 109B includes the lost motion device 108B. The lost motion device is configured to selectively operably connect the power drive unit to actuators 104A and 104B. The lost motion device is also configured to selectively operably disconnect the power drive unit from actuators 104A and 104B.

FIG. 2 shows actuator 108A, and as described above, shaft 201 is connected to the first shaft system 109A as shown in FIG. 1A and shaft 202 is connected to the second shaft system 109B as shown in FIG. 1A. Lost motion device 108A is identical to the lost motion device of 108B except for the connections between shafts 201 and 202 is different in lost motion device 108B than 108A. Thus the shafts 201 of lost motion device 108B is connected to the second shaft system 109B as shown in FIG. 1B and shaft 202 of lost motion device 108B is connected to actuators 104A and 104B as shown in FIG. 1B.

The connections of shafts 201 and 202 of shaft 108B in FIG. 1D are similar to those connections as shown in FIG. 1B.

Components shown in FIG. 1E which fulfils substantially the same function as those shown in FIG. 1C are labelled the same. FIG. 1E includes an auxiliary power drive unit 120. The auxiliary power drive unit 120 is not positioned centrally within the fuselage 12, rather it is positioned on the wing 14. Drive path 109B operably connects the auxiliary power drive unit to actuators 104C and 104D. Drive paths 109A is configured to operate between drive path 109B and actuators 104A and 104B. Drive path 109A includes lost motion device 108A. The lost motion device 108A is configured to selectively operably connect the drive path 109B to actuators 104A and 104B. Lost motion device 108A is also configured to selectively operably disconnect drive path 109B from actuators 104A and 104B.

Figure 1F:
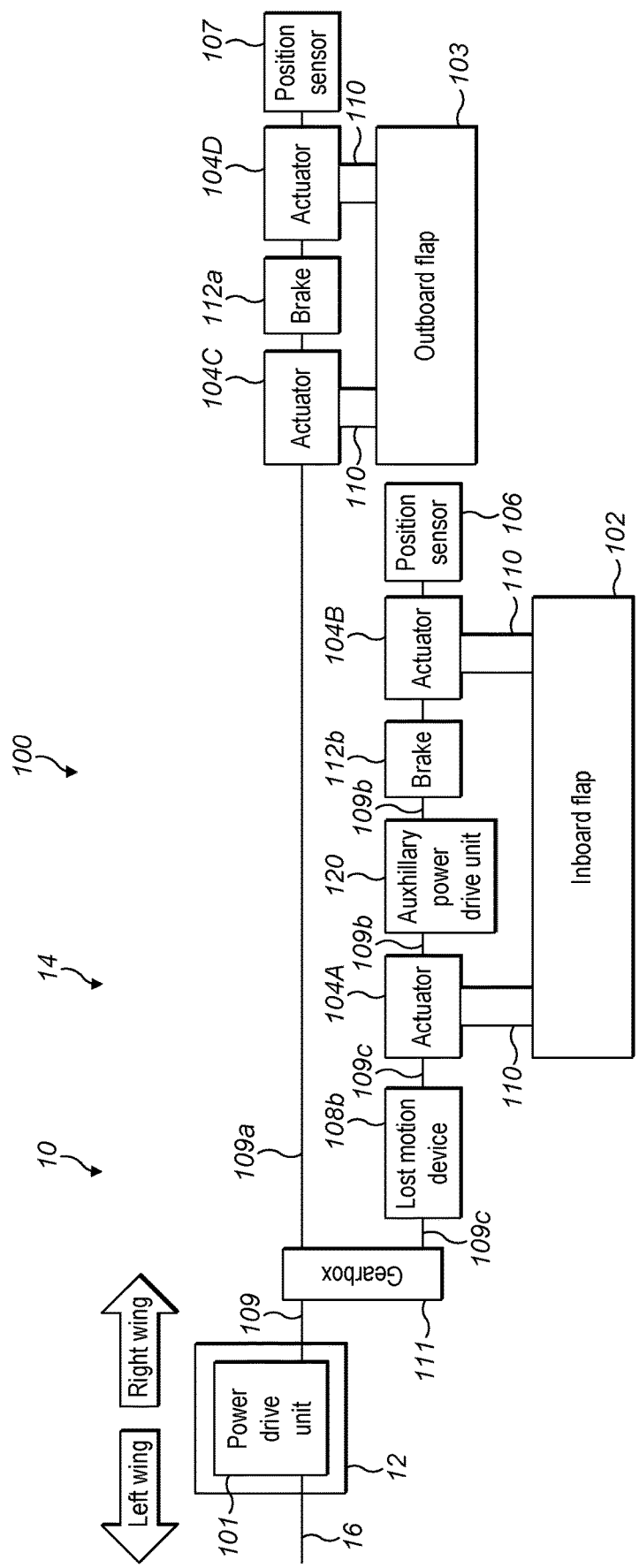
FIG. 1F is a schematic view of a system according to the present invention.

Components shown in FIG. 1F which fulfil substantially the same function as those shown in FIG. 1D are labelled the same. Operation of power drive unit 101 as shown in FIG. 1F is the same as operation of power drive unit 101 as shown in FIG. 1D. As shown in FIG. 1F, drive path 109B operably connects the auxiliary power drive unit 120 of FIG. 1F and the actuators 104A and 104B of FIG. 1F. A further drive path 109C/109A is configured to operate between the drive path 109B and actuators 104C and 104D. The drive path 109C/109A includes a lost motion device 108B. The lost motion device is configured to selectively operably connect drive path 109B to actuators 104C/104D. The lost motion device 108B of FIG. 1F is configured to selectively operably disconnect drive path 109B from the actuators 104C and 104D.

As shown in FIG. 2, lost motion device 108A as applied to FIG. 1A as a first part in the form of shaft 203 operably connected to drive path 109A and a second part in the form of shaft 211 operably connected to actuators 104C and 104D.

As shown in FIG. 2 lost motion device 108B as applied to FIG. 1B includes a first part in the form of shaft 203 operably connected to the power drive unit 101 of FIG. 1B and also has a second part in the form of shaft 211 operably connected to actuators 104A and 104B of FIG. 1B.

In the example shown in FIGS. 5A and 5B, the lost motion device has a lost motion travel that creates a 5 degree lag on the outboard flap when compared to the inboard flap when applied to FIG. 1A.

As shown in FIG. 1B, the inboard flap will lag the outboard flap.

As shown in FIG. 1C, the outboard flap will lag the inboard flap.

As shown in FIG. 1D, the inboard flap will lag the outboard flap.

As shown in FIG. 1E, when power drive unit 101 is operated, the outboard flap will lag the inboard flap. However, as shown in FIG. 1E when the auxiliary power drive unit is operated the inboard flap will lag the outboard flap.

As shown in FIG. 1F, when the power drive unit 101 is operated the inboard flap will lag the outboard flap. However, as shown in FIG. 1F when the auxiliary power drive unit 120 is operated the outboard flap will lag the inboard flap.

In the example shown in FIG. 5, the lag is 5 degrees. In further embodiments, a different amount of lag could be provided. The lag may be sufficient to enable wing camber adjustment during cruise to improve efficiency. The maximum amount of lag may be limited such that the aircraft remains in control even with the maximum lag between aerodynamic surfaces. The lag may be at least 1 degree. The lag may be at least 2 degrees. The lag may be at least 5 degrees. The lag may be at least 10 degrees. The lag may be a maximum of 10 degrees. The lag may be a maximum of 8 degrees. The lag may be a maximum of 5 degrees. The lag may be a maximum of 3 degrees.

As described above, synchronous and differential movement has been described with respect to an inboard flap and outboard flap. Actuators may operate more than one flap. Actuators of the same flap may be operated differentially and synchronously to move opposite ends of that flap as desired. The invention is not limited to synchronously and differentially moving flaps. The invention is applicable to any aerodynamic device (or part thereof) including leading edge flaps, trailing edge flaps, flaperons and any other suitable aerodynamic device.

In further embodiments, irreversible devices (such as shown in FIGS. 1A and 1B) may not be required. In further embodiments position sensors as shown in FIGS. 1A, 1B, 1C, 1D, 1E and 1F may not be required. In further embodiments brakes as shown in FIGS. 1C, 1D, 1E and 1F may not be required.

The invention is applicable to power drive units. The invention is applicable to auxiliary power drive units.

The invention is applicable to any type of lost motion device. The lost motion device may be a rotary lost motion device or a linear lost motion device. The lost motion device is not limited to including cooperating screw threads.

Movement of various shafts, PDU's and auxiliary PDU's has primarily been described with respect to rotary motion but the invention is not limited to rotary motion.

As shown in FIG. 2, shaft 203 of the lost motion device is offset from shafts 201 and 202. As shown in FIG. 2, certain parts of shaft system 109 are connected to shaft 201 and 202. In further embodiments equivalent parts of shaft system 109 may be attached to shaft 203 and 211.

As shown in FIG. 3 the brake 204 when applied disables the lost motion device. In further embodiments a brake such as brake 204 may not be required. Under such circumstances the lost motion device will be permanently enabled.

Where a lost motion device includes a brake such as brake 204, then in the event of failure of the brake, then the lost motion device may be designed to move aerodynamic devices to a suitable position that still ensures safe operation of the aircraft. Thus, consider the situation where the power drive unit 101 of FIG. 1A can move the inboard flap to a maximum of 35 degrees. In the event that brake 204 is operating correctly, then the power drive unit 101 of FIG. 1A could also move the outboard flap to 35 degrees. However, in the event that the brake 204 becomes inoperative, the power drive unit could nevertheless move the inboard flap to 35 degrees with the lost motion device moving the outboard flap to 30 degrees (assuming the above mentioned 5 degree lag) and such a flap configuration could nevertheless allow the aircraft to safely operate even though the desired flap position of the outboard flap would be 35 degrees.

A variant of FIG. 1E would be to move the auxiliary power drive unit 120 from the position shown in FIG. 1E to a position between the lost motion device 108A of FIG. 1E and the actuator 104C of FIG. 1E. Under these circumstances a first drive path 109A would be configured to operate between the auxiliary power drive unit and actuators 104A and 104B. A second drive path 109B would operably connect the auxiliary power drive unit and actuators 104C and 104D. The first drive path 109A will include the lost motion device 108A. The lost motion device would be configured to selectively operably connect the auxiliary power drive unit to actuators 104A and 104B. The lost motion device would also be configured to selectively operably disconnect the auxiliary power drive unit from actuators 104A and 104B.

A variant of FIG. 1F would be to move the auxiliary power drive unit 120 from the position shown in FIG. 1F to a position between lost motion device 108B of FIG. 1F and actuator 104A of figure F. Under these circumstances a first drive path would be configured to operate between the auxiliary power drive unit and actuators 104C and 104D. A second drive path would operably connect the auxiliary power drive unit and actuators 104A and 104B. The first drive path would include the lost motion device 108B. The lost motion device would be configured to selectively operably connect the auxiliary power drive unit to actuators 104C and 104D. The lost motion device would also be configured to selectively operably disconnect the auxiliary power drive unit from actuators 104C and 104D.

FIG. 6 shows a further embodiment of a lost motion device 408 wherein components that fulfil substantially the same function as those of lost motion device 108a are labelled with the same reference numbers. Whereas in lost motion device 108a the screw 205 was axially fixed and the nut 206 was caused to translate in an axial direction under certain circumstances, in the lost motion device 408, the nut 206 is axially fixed and the screw 205 moves axially under similar circumstances, in particular when the brake 204 of the lost motion device 408 is off. Thus, the screw 205 has an internal spline 450 which slideably engages an external spline 451 of shaft 203. Mounted within shaft 203 is sensor 406, in this example sensor 406 is a linear variable displacement transducer (LVDT). The body 406A of the LVDT 406 is secured axially fixed relative to shaft 203 (e.g. the body 406A may be fixed to a gearbox housing (not shown) and the bearings 314 which mount the shaft 203 may in turn be mounted in the gearbox housing). The probe 406B of the LVDT 406 engages a surface 453 of the screw 205. Thus as the screw 205 translates right or left, the LVDT 406 will be able to determine the position of one "side" of the lost motion device relative to the other "side". In other words, LVDT 406 is able to determine the positional status of the lost motion device 408.

Whereas with the system shown in FIG. 1A, position sensor 106 determines the relative position of the inboard flap 102 relative to the wing and position sensor 107 determines the relative position of the outboard flap 103 relative to the wing, comparing and contrasting FIGS. 1A/2 with FIG. 6 shows that the position sensor 106 is no longer required when the lost motion device includes position sensor 406.

Thus, the lost motion device 408 shown in FIG. 6 would be used in conjunction with a sensor (such a sensor 107) which would determine the relative position of the outboard flap relative to the wing, but does not require a sensor 106 to determine the relative position of the inboard flap relative to the wing. This is because the relative position of the inboard flap relative to the wing can be determined by knowing the relative position of the outboard flap relative to the wing (such as by using sensor 107) and by knowing the positional status of the lost motion device 408 (by using sensor 406). Such an arrangement is advantageous since it can provide for better positional accuracy of the inboard flap relative to the outboard flap.

By way of example, the inboard flap is typically able to move relative to the wing by a relatively large amount, in an example above, by 35 degrees. Similarly, the outboard flap can move relative to the wing by a relatively large amount (in the example above, by 35 degrees). The position sensor 106 and position sensor 107 therefore both need to be able to measure a relatively large deflection. Position sensors that are required to measure a large angle typically will have a relatively lower resolution when compared with position sensors which are only required to measure a relatively small angle, and therefore have a relatively better resolution. In an example above, the lost motion device (as shown in FIG. 5) only permits a maximum of +5 degrees or −5 degrees relative movement between the inboard flap 102 and the outboard flap 103. Thus, the lost motion device only permits a total of 10 degrees relative movement between the inboard flap and the outboard flap. Thus, using this example the sensor 406 only needs to detect a relatively small amount of relative movement (in this case 10 degrees), and as such the resolution of sensor 406 can be greater. In particular during flight, it is often desirable to ensure that an inboard flap and an outboard flap are "flush" relative to each other. Using a sensor that detects a positional status of the lost motion device makes it easier to ensure that an inboard flap and an outboard flap are "flush" relative to each other when desired.

When the lost motion device is installed in the aircraft wing it is necessary to adjust the inboard and outboard flaps to a fixed position with the lost motion device in a known position within it's stroke, typically referred to as rigging. Thus, when the flaps and actuators are installed in the wing, structural rigging bars are installed to set the flaps at a fixed position (typically at a zero position). The various torque shafts (e.g. of the shaft system 109) are then connected. Typically, the outermost torque shaft is installed first and then each successive torque shaft is installed working inwards towards the fuselage. Each torque shaft does not have an infinite resolution because of the number of spline teeth or the like used to connect it to an adjacent torque shaft so inevitably small adjustments are required. Nevertheless assembly is aimed at ensuring all flaps are flush. As regards the lost motion device, assume that it needs to be installed in a mid position. Typically the lost motion device will be installed in a gearbox housing or the like and as such it is not easy to visually check its positional status prior to installing. However, it is relatively simple to determine the positional status of a lost motion device which includes a sensor to detect the positional status. The LVDT can assist this rigging process since it indicates the internal position of the screw (205). This provides a further advantage of the device.

The lost motion device 408 could equally replace the lost motion device 108A and position sensor 106 of FIG. 1C or FIG. 1E. The lost motion device 408 could replace the lost motion device 108B of FIG. 1B, 1D, or 1E. Under these circumstances either the position sensor 106 could be deleted or the position sensor 107 could be deleted.

The lost motion device of FIG. 2 could be modified to include a sensor to determine the position of one "side" of the lost motion device relative to the other "side". In other words, such a sensor is able to determine the positional status of the lost motion device 108A or 108B. Such a device could replace any of the lost motion devices shown in FIGS. 1A to 1F in a similar manner as described above with respect to lost motion device 408.

Whilst a LVDT sensor has been shown in FIG. 6, any type of suitable sensor could be used with the embodiment shown in FIG. 6 or the embodiment shown in FIG. 2.

FIG. 7 shows a variant of system shown in FIG. 1A in which components that fulfil substantially the same function are labelled the same. Whereas the power drive unit of FIG. 1A may be driven by a single motor or by two motors, the power drive unit of FIG. 7 specifically has a first motor 510 and a second motor 520 associated with it. The first motor 510 may be braked by a first brake 512. The second motor 520 may be braked by a second brake 522. The first and second motors are connected to a speed summing differential gearbox, the output of which drives shaft system 109. Using two motors gives a greater degree of flexibility. Thus, shaft 109 can be driven by operating the first motor 510 alone, or by operating the second motor 520 alone, or by operating both the first and second motors together. An advantageous method of driving shaft 109 is as follows:

In a first mode, typically during take-off or landing, both the first and second motors are configured to drive both the first actuator and second actuator thereby driving both the inboard flap and the outboard flap together. This allows the inboard and outboard flaps to be driven to their take-off/landing position (i.e. to a relatively higher angle e.g. 30 degrees for the inboard flap and 30 degrees for the outboard flap) relatively quickly.

In a second mode the system is configured such that only the first motor is used and it only drives actuators 104A and 104B associated with the inboard flap 102. Typically this mode will be used for varying the wing camber during cruise when it is necessary to just move the inboard flap but not the outboard flap.

In a third mode only the second motor is used and it is used to drive all four actuators 104A, 104B, 104C and 104D, thereby moving both the inboard flap 102 and the outboard flap 103. This mode will be used to vary the wing camber during cruise when it is necessary to move the inboard and outboard flaps.

The first and second motors and first and second brakes shown in FIG. 7 could equally be used to drive any of the power drive units shown in FIG. 1A to 1F.

The advantage of such arrangement is that, during cruise, typically both the first motor and the second motor will be used to vary the wing camber, thereby evening out wear/service life of both the first and second motors. Furthermore, such an arrangement reduces the likelihood of undetected failure of either the first or second motor. In the event that either the first or second motor fails during cruise, this will be detected and warning systems will alert the flight crew. The flight crew, knowing that one of the motors has failed, can then take appropriate early action knowing that deployment of both flaps to say 30 degrees during landing may take longer since only one motor will be driving the flaps into this position.

FIG. 8 shows a variant of FIG. 7 wherein in addition to the two motors 510 and 520 there is a third motor 630. Associated with a third motor 630 is a third brake 632, a clutch 634 and an auxiliary power drive unit 636.

Providing three motors gives further options for controlling the inboard and outboard flap but a particularly advantageous method of controlling the flaps is as follows:

In a first mode the first motor alone, or the second motor alone, or the first and second motors working together drive all four actuators 104A, 104B, 104C, 104D thereby moving both the inboard flap 102 and outboard flap 103 together. This allows the inboard and outboard flaps to be driven to their take-off/landing position (i.e. to a relatively high angle e.g. 30° for the inboard flap and 30° for the outboard flap).

In a second mode the first motor alone, or the second motor alone, or the first and second motors together drive only the actuators 104A and 104B thereby moving only the inboard flap 102. Typically this mode will be used for varying the wing camber during cruise when it is necessary to just move the inboard flap but not the outboard flap.

In a third mode the third motor is used to drive only the actuators 104C and 104D thereby moving only the outboard flap 103. Typically this mode will be used for varying the camber during cruise when it is necessary to just move the outboard flap but no the inboard flap.

The first and second motors and first and second brakes shown in FIG. 8 could equally be used by any of the power drive units shown in FIGS. 1A to 1F. One or more of the third motor, third brake, clutch and auxiliary power drive unit of FIG. 8 could be used in a similar position with respect to the outboard flap in FIGS. 1A, 1C and 1E. The auxiliary power drive unit and adjacent brake of FIG. 1F could be replaced by the third motor, third brake, clutch and auxiliary power drive unit of FIG. 8. The brake associated with the inboard flap of FIG. 1B could be replaced by the third motor, third brake, clutch and auxiliary power drive unit of FIG. 8. One or more of a third motor, third brake, clutch and auxiliary power drive unit of FIG. 8 could be associated with the inboard flap of FIG. 1B.

As described above with respect to FIG. 2, with the brake 204 applied movement of shaft 201 in one direction will cause movement of shaft 202 in the same direction and movement of shaft 201 in the opposite direction will cause movement of shaft 202 in the opposite direction. With the brake 204 disabled, and hence the lost motion device enabled, sufficient movement of shaft 201 in a first direction will ultimately cause movement of shaft 202 in the same direction once the limit of lost motion travel has been reached i.e. appropriate rotation stops engage each other. Similarly, sufficient rotation of shaft 202 in an opposite direction will cause rotation of shaft 202 in the opposite direction once the limited lost motion travel has been reached, i.e. appropriate rotation stops engage each other. As such, the brake 204 is connected in parallel with the lost motion device. In further embodiments, the lost motion device need not have a brake connected in parallel. In further embodiments, the brake need not have a lost motion device connected in parallel (and in such a device the brake acts as a clutch to operably clutch shaft 102 to shaft 202 or to operably de-clutch shaft 201 to shaft 202 when the clutch is engaged or disengaged).

The invention claimed is:

1. A system for an aircraft wing comprising:
a power drive unit;
a first actuator for actuating a first aerodynamic device;
a second actuator for actuating a second aerodynamic device;
a first drive path configured to operate between the power drive unit and the first actuator;
a second drive path operably connecting the power drive unit and the second actuator;
the first drive path including a lost motion device;
the lost motion device being configured to selectively operably connect the power drive unit to the first actuator and to selectively operably disconnect the power drive unit from the first actuator; and
the lost motion device allowing a limited amount of movement of the power drive unit relative to the first actuator until a first travel limit is reached.

2. A system as defined in claim 1 wherein the lost motion device has a first part operably connected to the power drive unit and a second part operably connected to the first actuator.

3. A system as defined in claim 2 wherein the lost motion device is configured to have lost motion movement and the first part is configured to move in a first direction relative to the second part.

4. A system as defined in claim 3 wherein the lost motion device comprises a first lost motion movement stop configured to limit movement of the first part in the first direction relative to the second part.

5. A system as defined in claim 4 wherein the first part is configured to move in a second direction relative to the second part and the lost motion device comprises a second lost motion stop configured to limit movement of the first part in the second direction relative to the second part.

6. A system as defined in claim 5 wherein the first direction is a first rotational direction and the second direction is a second rotational direction.

7. A system as defined in claim 2 wherein the first part includes a first lost motion component with a first thread and the second part includes a second lost motion component with a second thread that is configured to cooperate with the first thread, the first lost motion component being configured to move linearly relative to the second lost motion component when the power drive unit is selectively operably disconnected from the first actuator.

8. A system as defined in claim 7 wherein the first part is prevented from moving in a first linear direction relative to the second part when the power drive unit is selectively operably connected to the first actuator.

9. A system for an aircraft wing comprising:
a power drive unit;
a first actuator for actuating a first aerodynamic device;
a second actuator for actuating a second aerodynamic device;
a first drive path operably connecting the power drive unit and the first actuator;
a second drive path configured to operate between the first drive path and the second actuator;
the second drive path including a lost motion device; and
the lost motion device being configured to selectively operably connect the first drive path to the second actuator and to selectively operably disconnect the first drive path from the second actuator, the lost motion device allowing a limited amount of movement of the power drive unit relative to the second actuator until a first travel limit is reached.

10. A system as defined in claim 9 wherein the lost motion device has a first part operably connected to the first drive path and a second part operably connected to the second actuator.

11. A system as defined in claim 10 wherein the lost motion device is configured to have lost motion movement and the first part is configured to move in a first direction relative to the second part.

12. A system as defined in claim 11 wherein the lost motion device comprises a first lost motion movement stop configured to limit movement of the first part in the first direction relative to the second part.

13. A system as defined in claim 12 wherein the first part is configured to move in a second direction relative to the second part and the lost motion device comprises a second lost motion stop configured to limit movement of the first part in the second direction relative to the second part.

14. A system as defined in claim 13 wherein the first direction is a first rotational direction and the second direction is a second rotational direction.

15. A system as defined in claim 10 wherein the first part includes a first lost motion component with a first thread and the second part includes a second lost motion component with a second thread that is configured to cooperate with the first thread, the first lost motion component being configured to move linearly relative to the second lost motion component when the first drive path is selectively operably disconnected from the second actuator.

16. A system as defined in claim 15 wherein the first part is prevented from moving in a first linear direction relative to the second part when the first drive path is selectively operably connected to the second actuator.

17. A system as defined in claim 16 wherein the first part is prevented from moving in a second linear direction relative to the second part when the first drive path is selectively operably connected to the second actuator.

18. A system as defined in claim 15 wherein the first thread and second thread have a thread pitch and the first component is configured to move linearly relative to the second component by more than the thread pitch.

19. A system as defined in claim 10 comprising a first position sensor to determine the position of the first part or the second part relative to a wing and a second position sensor to determine the position of the first part relative to the second part.

20. A method of operating a system as defined in claim 19 comprising the steps of moving the first actuator from a first actuator current position to a first actuator desired position and moving the second actuator from a second actuator current position to a second actuator desired position by:
a) enabling the lost motion device such that operating the power drive unit moves the first actuator and moves the second actuator via the lost motion device to the second actuator desired position,
b) then whilst the lost motion device is enabled operating the power drive unit to move the first actuator to the first actuator desired position such that the second actuator remains at the second actuator desired position, and using the second position sensor to determine the position of the first part relative to the second part.

21. A system as defined in claim 9 further comprising a brake, the brake being configured to selectively operably connect the first drive path to the second actuator and to selectively operably disconnect the first drive path from the second actuator.

22. A system as defined in claim 21 wherein:
the first part includes a first lost motion component with a first thread;
the second part includes a second lost motion component with a second thread that is configured to cooperate with the first thread;
the first lost motion component is configured to move linearly relative to the second lost motion component when the first drive path is selectively operably disconnected from the second actuator;
the brake has a first brake component that is rotationally fast with the first lost motion component;
the brake has a second brake component that is rotationally fast with the second lost motion component; and
application of the brake causes the first brake component to become rotationally fast with the second brake component.

23. A method of operating a system as defined in claim 9 comprising the steps of moving the first actuator from a first actuator current position to a first actuator desired position and moving the second actuator from a second actuator current position to a second actuator desired position by:
a) enabling the lost motion device such that operating the power drive unit moves the first actuator and moves the second actuator via the lost motion device to the second actuator desired position,
b) then whilst the lost motion device is enabled operating the power drive unit to move the first actuator to the first actuator desired position such that the second actuator remains at the second actuator desired position.

24. The method as defined in claim 23 wherein during step a) the power drive unit moves in a first direction and during step b) the power drive unit moves in a second direction opposite to the first direction.

25. A system as defined in claim 9 wherein the lost motion device is permanently enabled.

* * * * *